(12) United States Patent
Joseph et al.

(10) Patent No.: US 9,934,777 B1
(45) Date of Patent: Apr. 3, 2018

(54) CUSTOMIZED SPEECH PROCESSING LANGUAGE MODELS

(71) Applicant: Amazon Technologies, Inc., Seattle, WA (US)

(72) Inventors: Shaun Nidhiri Joseph, Somerville, MA (US); Sonal Pareek, Arlington, MA (US); Ariya Rastrow, Seattle, WA (US); Gautam Tiwari, Boston, MA (US); Alexander David Rosen, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 15/248,211

(22) Filed: Aug. 26, 2016

Related U.S. Application Data

(60) Provisional application No. 62/357,529, filed on Jul. 1, 2016.

(51) Int. Cl.
| | | |
|---|---|---|
| *G10L 15/00* | (2013.01) | |
| *G10L 15/06* | (2013.01) | |
| *G10L 15/193* | (2013.01) | |
| *G10L 15/02* | (2006.01) | |
| *G10L 15/08* | (2006.01) | |
| *G10L 15/22* | (2006.01) | |
| *G10L 15/30* | (2013.01) | |
| *G10L 15/18* | (2013.01) | |

(52) U.S. Cl.
CPC ............ *G10L 15/063* (2013.01); *G10L 15/02* (2013.01); *G10L 15/08* (2013.01); *G10L 15/1815* (2013.01); *G10L 15/193* (2013.01); *G10L 15/22* (2013.01); *G10L 15/30* (2013.01); *G10L 2015/025* (2013.01); *G10L 2015/0635* (2013.01)

(58) Field of Classification Search
CPC ... G10L 15/063; G10L 15/1815; G10L 15/30; G10L 15/08; G10L 15/02; G10L 15/193; G10L 15/22; G10L 2015/025; G10L 2015/0635
USPC .................................. 704/243, 244, 252, 276
See application file for complete search history.

(56) References Cited

U.S. PATENT DOCUMENTS

2017/0125012 A1* 5/2017 Kanthak ............... G10L 15/063

* cited by examiner

*Primary Examiner* — Thierry L Pham
(74) *Attorney, Agent, or Firm* — Pierce Atwood LLP

(57) ABSTRACT

User-specific language models (LMs) that include internal word indexes to a word table specific to the user-specific LM rather than a word table specific to a system-wide LM. When the system-wide LM is updated, the word table of the user-specific LM may be updated to translate the user-specific indices to system-wide indices. This prevents having to update the internal indices of the user-specific LM every time the system-wide LM is updated.

20 Claims, 22 Drawing Sheets

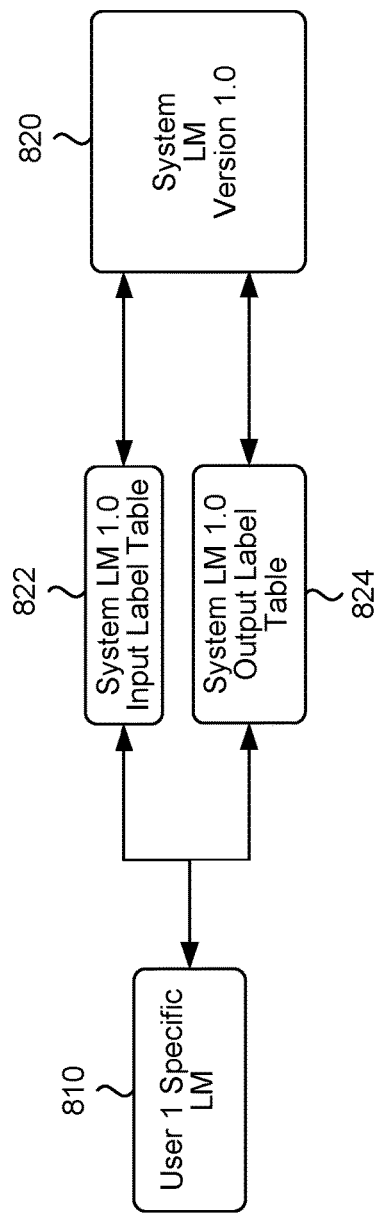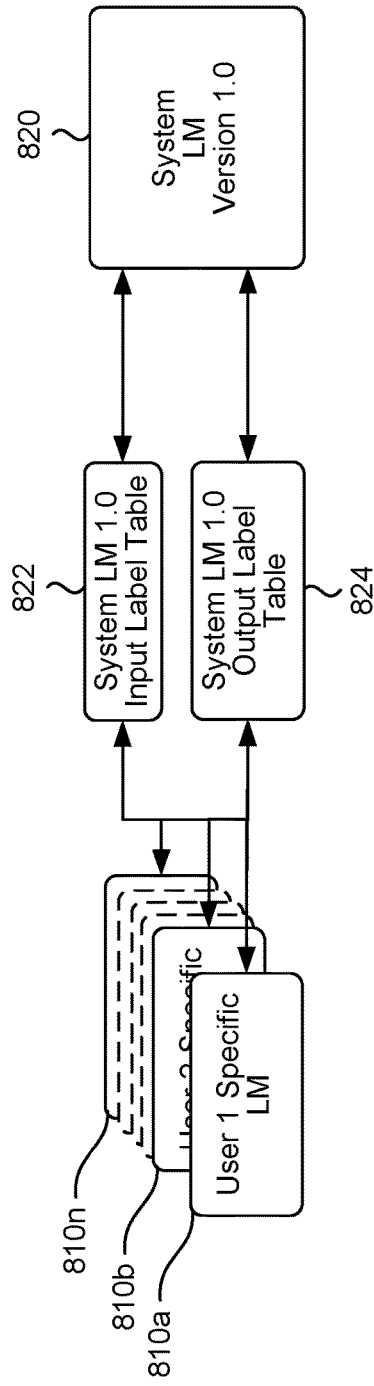

CUSTOMIZED SPEECH PROCESSING LANGUAGE MODELS

CROSS-REFERENCE TO RELATED APPLICATION DATA

This application claims priority to U.S. Provisional Patent Application Ser. No. 62/357,529, entitled "Rebuilding of Customized Speech Processing Language Models," filed on Jul. 1, 2016, in the names of Shaun Nidhiri Joseph et al. The above provisional application is herein incorporated by reference in its entirety.

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is sometimes referred to herein as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 8A and 8B illustrate a user-specific language models that reference input and output label tables configured for a particular system LM FST according to embodiments of the present disclosure.

DETAILED DESCRIPTION

Figure 1:
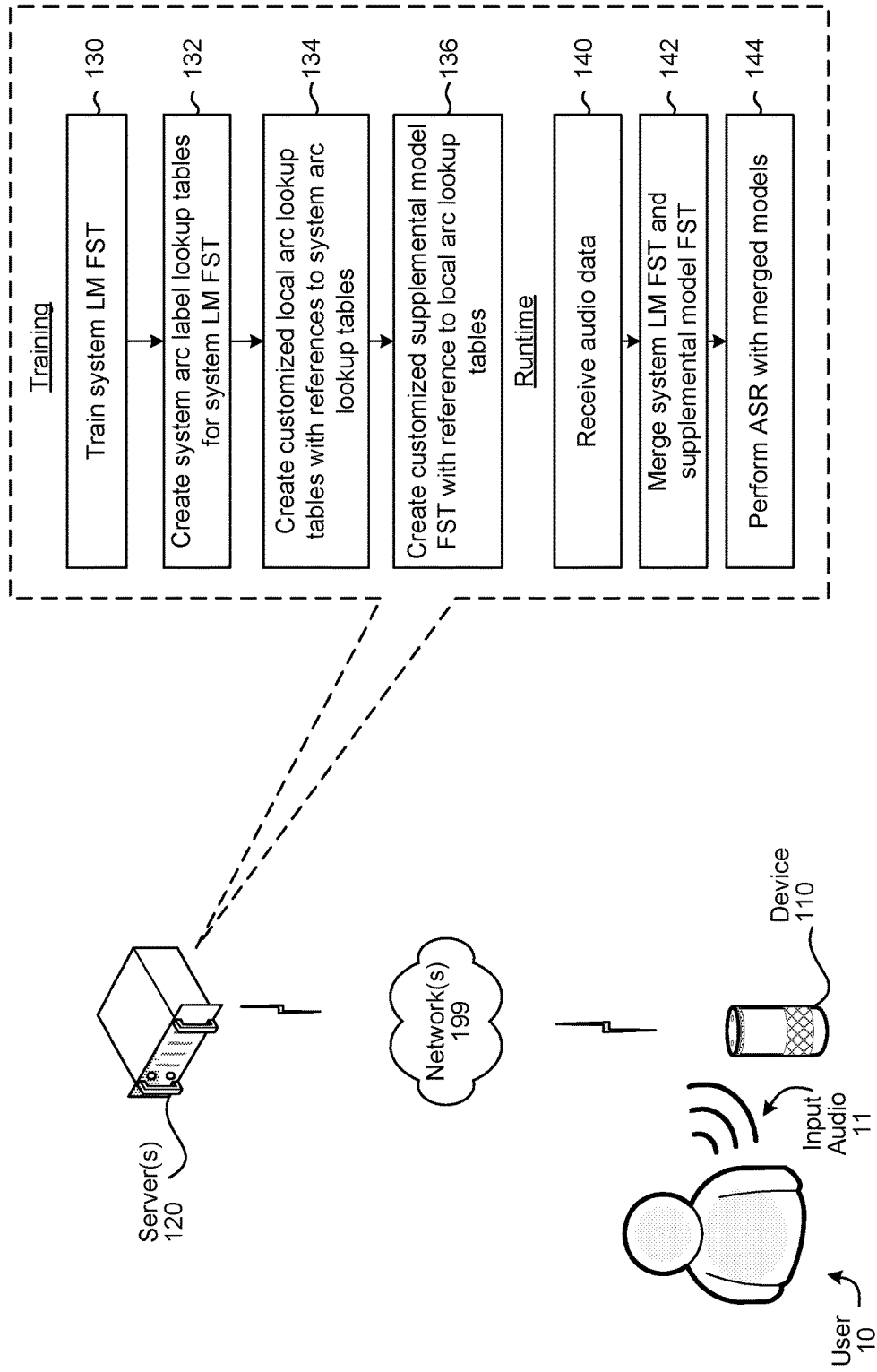
FIG. 1 illustrates a system for creating and using customized language models in an automatic speech recognition (ASR) system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used to when performing speech processing. An example of such a distributed environment may involve a local client device (e.g., a device in the same environment as a user and capable of capturing spoken commands from the user) having one or more microphones being configured to capture sounds from a user speaking (e.g., "utterances") and convert those sounds into data (e.g., "an audio signal"). The audio signal/data may then be sent to a downstream remote device for further processing, such as converting the audio signal into an ultimate command. The command may then be executed by a combination of remote and local devices depending on the command itself.

Finite State Transducers (FSTs) are widely used in ASR systems to encode different knowledge sources (e.g., models) used during search. In certain aspects an FST may be used to model incoming sounds to words (called an HCL FST, described below). In certain aspects an FST may be used to model words to sentences (called a G FST, or language model/grammar described below). In certain aspects an FST may be used to model incoming sounds to sentences (called an HCLG FST, described below). A language model is a model that indicates how likely certain words are used together, as based on many different example sentences and text available to the system. Such language models may encode a representation of how likely such words or word combinations are likely to be used by a speaker, thus assisting an ASR system in determining the likelihood that a certain word was spoken during an utterance being processed. Such language models are used with acoustic models (that are used to determine a likelihood that a certain detected sound corresponds to a particular acoustic unit) to transform audio data into text.

A general, system language model may be created based on a large corpus of data. The corpus of data may include many different examples of text representing words as they may be used in spoken utterances, web sources, news, or other sources of text. The resulting language model from the large corpus of data may thus represent to the system how likely the system is to receive certain words in a certain order. As such general purpose language models may be very large, a speech processing system may use a single system language model to process incoming audio corresponding to many different users.

Certain language models (either structured as FSTs or in another form) used by a speech processing system may also be customized for a particular user to incorporate user-specific (or user-profile specific) information such as song titles in a user's music library, books that a user has access to and may request to be read, appliance names, or other word sequences or information specific to a user that a speech processing should be able to recognize when performing ASR. Such customized language models may be used in conjunction with general system language models (that are used more broadly) to create an expansive vocabulary recognizable by a speech processing system. Language models (such as user-specific language models) that are used to supplement a general system language model may be referred to as supplemental language models or supplemental models. As can be appreciated, the construction of a supplemental model may depend on the contents of a general system language model. For example, if a general system language model includes a certain word, the supplemental model may refer to that word using a numerical index located within the supplemental model (for example as a label on an arc of a supplemental model FST). That index then points to a word table that may be referenced during runtime processing when audio is being converted to text. The word table may be a data structure (of various forms) that lists words in an indexed form.

To keep a speech processing system current, it may be desirable to perform regular updates of a general system language model. Doing so, however, may have the undesired effect of requiring updating many different user-specific language models. This is because, for ease of construction, a supplemental language model may use word indices that correspond to a word table of the general system language model. While this approach may make initial construction of a supplemental language model easier, if a general system language model changes, and its word table and/or indices are changed, any supplemental models that depend on the original word table and/or indices must be updated or else errors will occur. A general speech processing system, however, can have thousands or millions of users, each with one or more user-specific language model, as well as other supplemental models that may be used to process utterances at runtime. Updating many such supplemental models each time a general system language model changes can be resource intensive.

Offered is a system and method for configuring language models in a manner that allows for more flexibility and consumption of fewer computing resources in case of language model updates. In particular, local lookup tables for words in arc labels are used where each supplemental model may have its own tables. Entries in those tables may be referenced by the arcs of a supplemental model FST and may point to words in tables corresponding to the general system language model. In this manner, when a general system language model is updated, the individual supplemental model FST need not be changed, but rather a reconciliation table or other model can be used to ensure the local tables match the updated general system language model tables.

FIG. 1 shows a system 100 configured to create and use compressed FSTs in an ASR system. Although FIG. 1 and other figures/discussion illustrate the operation of the system in a particular order, the steps described may be performed in a different order (as well as certain steps removed or added) without departing from the intent of the disclosure. As shown in FIG. 1, a system 100 may include one or more devices 110 nearby to user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1, during a training process the system may train (130) a system language model (LM) FST. The system may also create (132) system arc label lookup tables for the system LM FST. The system may also create (134) a customized local arc lookup table with references to the system arc lookup tables. The system may also create (136) a customized supplemental model FST with references to the local arc lookup tables. This process may be repeated multiple times to create multiple customized supplemental models, where each may correspond to a different user/user profile.

After the FSTs and tables are created, they may be stored and then used at runtime. For example, at runtime a user 10 may speak an utterance (represented by input audio 11) including a query to a device 110. The device 110 may convert the audio 11 into audio data 111 and send the audio data to the server(s) 120. The server(s) 120 may then receive (140) the audio data corresponding to the query. The system may merge (142) the system LM FST and supplemental model FST and perform (144) ASR processing using the merged models where the arc labels in the supplemental model tables are used to reference words in the system LM lookup tables.

Figure 2:
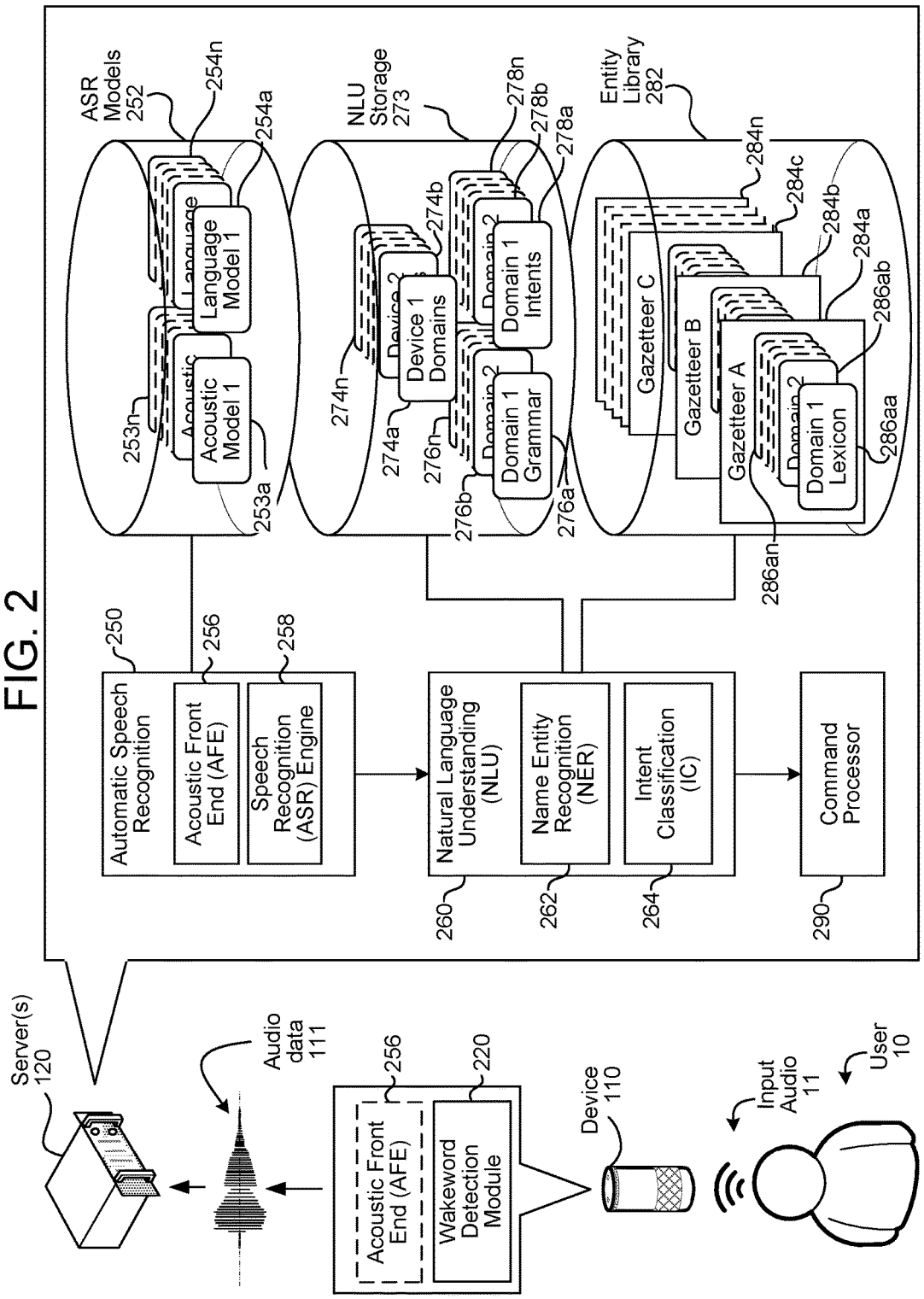
FIG. 2 is a conceptual diagram of a speech processing system according to embodiments of the present disclosure.

Further details are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM), Gaussian Mixture Model (GMM) or Deep Neural Network (DNN) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting involves hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a ASR engine 258. The acoustic front end (AFE) 256 transforms the audio data from the microphone into data for processing by the speech recognition engine. The ASR engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253 and language models 254. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

Following ASR processing, the ASR results may be sent by the ASR engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and NLU storage 273. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

The NLU process may be configured to parse and tag text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Thus, certain data may be associated with the word "call" indicating that it corresponds to a command and other data may be associated with the word "mom" indicating that it corresponds to an entity.

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 273 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's storage 273). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried (either serially or in parallel), potentially producing two different results.

The comparison process used by the NER module 262 may classify (e.g., score) how closely a database entry compares to a tagged query word or phrase, how closely the grammatical structure of the query corresponds to the applied grammatical framework, and (based on, e.g., whether the database indicates a relationship between an entry and information identified) to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

As discussed above, during ASR processing the ASR engine 258 attempts to match received feature vectors to words or subword units. A subword unit may be a phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

Figure 3:
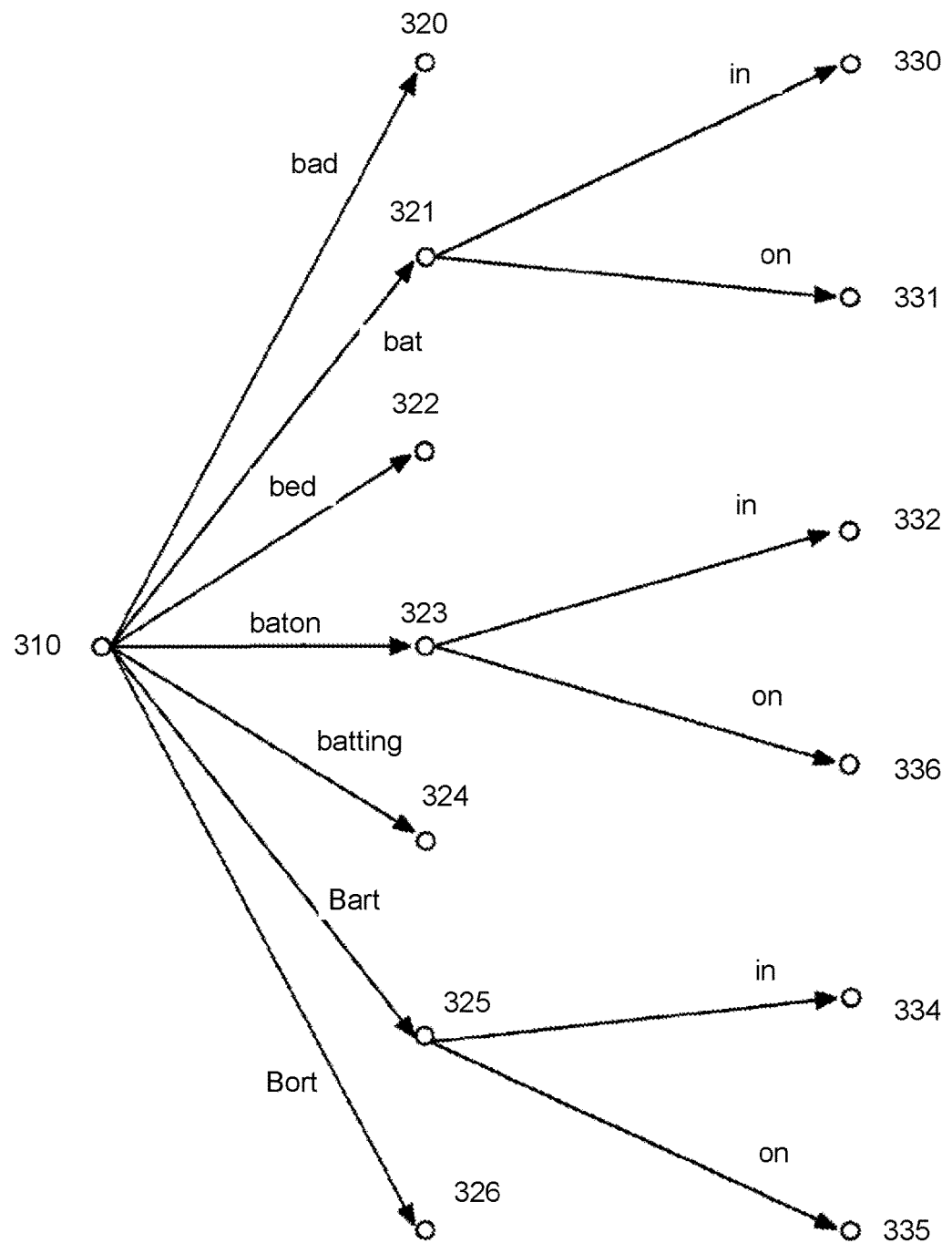
FIG. 3 illustrates a word result network according to embodiments of the present disclosure.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 3 shows an example of a word result network that may be used by a ASR engine 258 for recognizing speech according to some aspects of the present disclosure. A word result network may consist of sequences of words that may be recognized and the likelihood of each sequence. The likelihood of any path in the word result network may be determined by an acoustic model and a language model. In FIG. 3, the paths shown include, for example, "bad", "bat in", "bat on", "bed", "baton in", "baton on", "batting", "Bart in", "Bart on", and "Bort".

As illustrated in FIG. 3, a word result network may start at initial node 310. At node 310, no words may have been recognized yet as the ASR engine 258 commences its processing. From node 310, the ASR engine 258 may create arcs and additional nodes where each arc may be associated with a potential word that may be recognized. In some applications, words may be represented by nodes instead of arcs. In FIG. 3, arcs from node 310 to nodes 320 to 326 are labeled with example words that may be recognized by the ASR engine 258.

From initial node 310, the ASR engine 258 may apply acoustic and language models to determine which of the arcs leaving node 310 are most likely to occur. For an acoustic model employing HMMs, ASR engine 258 may create a separate HMM for each arc leaving node 310. Applying the acoustic and language models the ASR engine 258 may decide to pursue some subset of the arcs leaving node 310. For example, in FIG. 3, the ASR engine 258 may decide to follow the paths starting with "bad", "bat", and "bed" and may decide to stop pursuing the paths starting with "baton", "batting", "Bart," and "Bort" based on the respective scores of those arc, with the ASR engine 258 pursuing only the higher scoring arcs in an effort to concentrate computing resources on the arcs most likely to result in a correct result.

The ASR engine 258 may return an N-best list of paths along with their respective recognition scores, corresponding to the top N paths as determined by the ASR engine 258. An application (such as a program or component either internal or external to the ASR device 302) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

In one aspect of the disclosure, the ASR engine 258 may use a finite state transducer (FST) to perform speech recognition. An FST is a graph that may include all possible words that may be recognized by the ASR engine 258. While the word result network of FIG. 3 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 3. The word result network of FIG. 3 may be built out to include all possible utterances that could be recognized by the ASR engine 258. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be creating by composing other FSTs. For example, an FST that includes words and phones may be created by composing an FST of words with an FST of phones.

In certain aspects, different finite state transducers (FSTs) are used for different speech processing tasks. One FST may be used for Hidden Markov Model (HMM) operations to input model temporal dynamics of speech such as phone duration (referred to as an "H" FST). Another FST may be used to model phonotactic context dependency (referred to as a "C" FST). Another FST may be the language FST used to map sequences of phones to words (referred to as an "L" FST). Finally, another FST, known as the grammar, models individual words to sequences of words that are likely to be used together (referred to as a "G" FST). Thus, the H FST transduces an audio feature vectors (corresponding to audio frames) into context dependent phones, the C FST enforces usage constraints and transduces context dependent phones to context independent phones, the L FST transduces context independent phones to words and the G FST transduces words to words that are likely to make sense together, as according to a language model.

In certain situations certain operations may be grouped into a large FST that incorporates the different operations such as an HCLG FST that incorporates all of the above operations, thus yielding a final search graph that is the composition of the above FSTs. In other situations the operations are grouped differently, where one FST is an HCL FST and another FST is a G FST. This configuration may be useful for domain-specific or user-specific (or other customized) grammars (i.e., G FSTs) that can be swapped in or out for different incoming speech requests, and paired with an existing HCL FST to obtain desired speech results. A user-customized FST may be created by capturing information about how a user interacts with a voice-controlled system and noting what words are typically spoken by a user to a device. The system may then customize an FST by weighting more heavily word sequences frequently spoken by a user and/or including user-favored words in an FST that may otherwise not be included.

An FST, particularly a general system language model, may generally be constructed based on a text corpus that includes a large amount of text representing sentences that may be spoken by users. The FST is thus constructed so that it may represent a large number (though not necessarily infinite) number of potential sentences that may be spoken. The FST may be sufficiently granular, however, that each state may represent a particular acoustic unit (such as a senon, phoneme, etc.). Thus, each state of the FST may represent a portion in the progression of potential incoming sounds and how those sounds relate to spoken words. As incoming feature vectors corresponding to audio frames are processed by the ASR engine 258, it may travel from state to state along arcs of the FST. States/arcs that are traversed (and not pruned) are preserved to form a lattice. As each state of the FST is processed by a ASR engine 258, the engine 258 may keep track of the information associated with that portion of the FST (represented by outgoing labels on the arcs between FST states) to build the likely ASR result. Thus, words corresponding to traversed outgoing arcs may be used to construct the lattice, and from the lattice an N best list of potential ASR results.

The FST is thus a directed graph where each arc has certain properties such as input labels, output labels, a weight associated with each arc, and an end state where the arc leads. As feature vectors for audio frames are processed by the ASR engine 258, it may traverse the FST to form a lattice representing potential speech recognition results. A lattice may also be formed using the acoustic models and language model described above. In the context of an FST, as the ASR engine 258 traverses through states in the FST, it may assign a score to each state or arc on the FST. After traversing an arc, the weight of the arc of the FST, the weight of the arc may be added to the total cost of the path leading to that arc. To save computational resources, the ASR engine 258 may prune and discard low recognition score states or paths that have little likelihood of corresponding to the spoken utterance, either due to low recognition scores, or for other reasons. Thus a certain number of states may be preserved for each frame, and those states may be connected to states associated with the next frame (that survived a pruning), thus ultimately resulting in multiple paths through the FST representing potential speech recognition results. After traversing the FST, the path with the best score (which may be the highest score or lowest score depending on the configuration of the FST) may be selected as the most likely path.

FIGS. 4A-4D illustrate different a small section of an ASR FST. In particular, FIGS. 4A-4D a small portion of an HCLG FST that may be traversed when processing audio data representing speech and determining whether that audio data corresponds to the word "bat" or the word "bad." (Although a full HCLG FST may be configured to transduce acoustic units to full sentences, only a portion of an HCLG FST is shown for illustration purposes. Thus while FIGS. 4A-4D are illustrative, an implemented full HCLG FST may have certain differences from the portions shown.) The FST portion shows a single start state (state 0 shown in FIG. 4A) and multiple end states (states 62, 68, 69, 81, 82, and 83, shown in FIGS. 4C and 4D). In a full FST for speech processing there may be one or multiple start states and many more end states. Further, the end states may be located at various locations throughout the FST to represent different potential end portions that may be received by a potential utterance.

As can be seen in FIGS. 4A-4D, each state has one or more arcs outgoing from it that lead from the particular state to the next state. Each arc is associated with an input label, an output label and a score, shown in the figures as [input label]:[output label]/[score]. Thus, for example, arc 402 outgoing from state 0 to state 2 has an input label of 10, an output label of <eps> (explained below) and a score of 0.15137. The scores illustrated in FIGS. 4A-4D the scores represent scores or "costs" of each arc, where a lower scoring arc represents an arc that is more likely to be traversed/chosen than a higher scoring arc. In the present illustration of FIGS. 4A-4D, the illustrated scores roughly correspond to the negative logarithm of the probability the particular arc may be traversed, but multiple scoring configurations are possible. Further, the scores illustrated in FIGS. 4A-4D represent scores of the arcs in the FST prior to ASR processing. During processing, those scores will be adjusted using the scores of the acoustic model, as explained below. Although the scores illustrated represent one way of scoring arcs, other techniques may also be used. Further, while lower scores illustrated in FIGS. 4A-4D are considered "better," as in, more likely to be selected during ASR, in other configurations higher scores may be considered more likely to be selected.

As noted below, the input labels and output labels of an arc in an FST may include pointers to tables that track the individual labels. Further, for an ASR FST such as that illustrated in FIGS. 4A-4D, the input labels may correspond to individual acoustic speech units such as phonemes or senons or portions thereof. A senon is a grouping of HMM states which represents a particular grouping of phones as may be used together in speech. Each phone may have a number of incrementally different sounds depending on its context (e.g., the surrounding phones). While English may have approximately 50 phones it has several thousand sound groupings represented by senons. Use of senons in ASR processing may allow for improved ASR results. Thus, for example, arc 402 outgoing from state 0 in FIG. 4A has an input label of 10. That may correspond to entry 10 of an input label table, which in term may correspond to a particular phoneme or portion thereof, for example corresponding to a beginning of a "b" sound as might be spoken in "bat." Further remaining input labels on arcs outgoing from state 0 (4 in arc 404 from state 0 to state 3, 5480 in arc 406 outgoing from state 0 to state 5, 16 in arc 408 outgoing from state 0 to state 1, and 2 in arc 410 outgoing from state 0 to state 4) may each represent different acoustic units that may be identified by an acoustic model. In the example of the figures, these input labels may also correspond to different speech units that represent different ways of making a "b" sound. As the FST is traversed during ASR (explained below), the system may use the input labels to determine how to traverse the FST (based on the output from the acoustic model).

The output labels of the arcs may be collected by the ASR engine 258 for eventual use in outputting ASR results. As can be appreciated by FIGS. 4A-4D, however, many arcs have a label <eps> (either as input label or as output label) which represents the label epsilon (ϵ). Epsilon is representative of a null label. That is, arcs with <eps> as an output label, have no output label and thus do not contribute any words to a potential ASR result. Arcs with <eps> as an input label do not need acoustic input to be traversed, and thus may be traversed as part of ASR processing without a new input audio feature vector. For example, if the ASR engine 258 reaches state 10, it may traverse arc 430 from state 10 to state 15 as there is no input label on that arc that refers to an indexed acoustic unit. The ASR engine 258, however, will not traverse arc 432 outgoing from state 15 until a new audio feature vector is processed, as arc 432 has an input label of 5570, which refers to an acoustic unit, thus requiring a new audio feature vector be processed before arc 432 is traversed.

Only certain portions of an FST have an output label. For example, as shown in FIG. 4B, only arcs 440 and 442 have an output label. Arc 440, from state 23 to state 26 has an output label of "bad" and arc 442 from state 23 to state 27 has an output label of "bat." Because the FST portion of FIGS. 4A-4D only illustrate choosing between the words "bad" and "bat", the output labels corresponding to "bad" and "bat" are located at the point in the illustrated FST portion branches between the two words. Thus, only after the speech recognition system 258 has traversed those particular arcs (which can only be reached if the system traverses the arcs before), will the speech recognition system 258 output either the word "bat" or the word "bad" (with a corresponding score) from the FST. As can be appreciated, many states and arcs may be traversed before a word is output using an FST during ASR. This logically follows from the understanding that certain states of an FST may be correspond to a single audio frame, and an audio frame may be only 10 ms long. Thus many frames (and states) need to be processed before a word may be recognized.

During runtime ASR processing, the ASR engine 258 may take incoming audio feature vectors corresponding to audio frames and may process them with an acoustic model 253. For each processed feature vector, the acoustic model processing will then result in acoustic model output including a list of potential acoustic units corresponding to the feature vector along with a corresponding list of acoustic scores for the respective potential acoustic units. The ASR engine 258 will then identify those acoustic units in the input labels of particular states currently under consideration at the FST and will rescore the arcs associated with those acoustic units using both the acoustic scores and the scores of the arcs built into the FST.

Figure 4A:
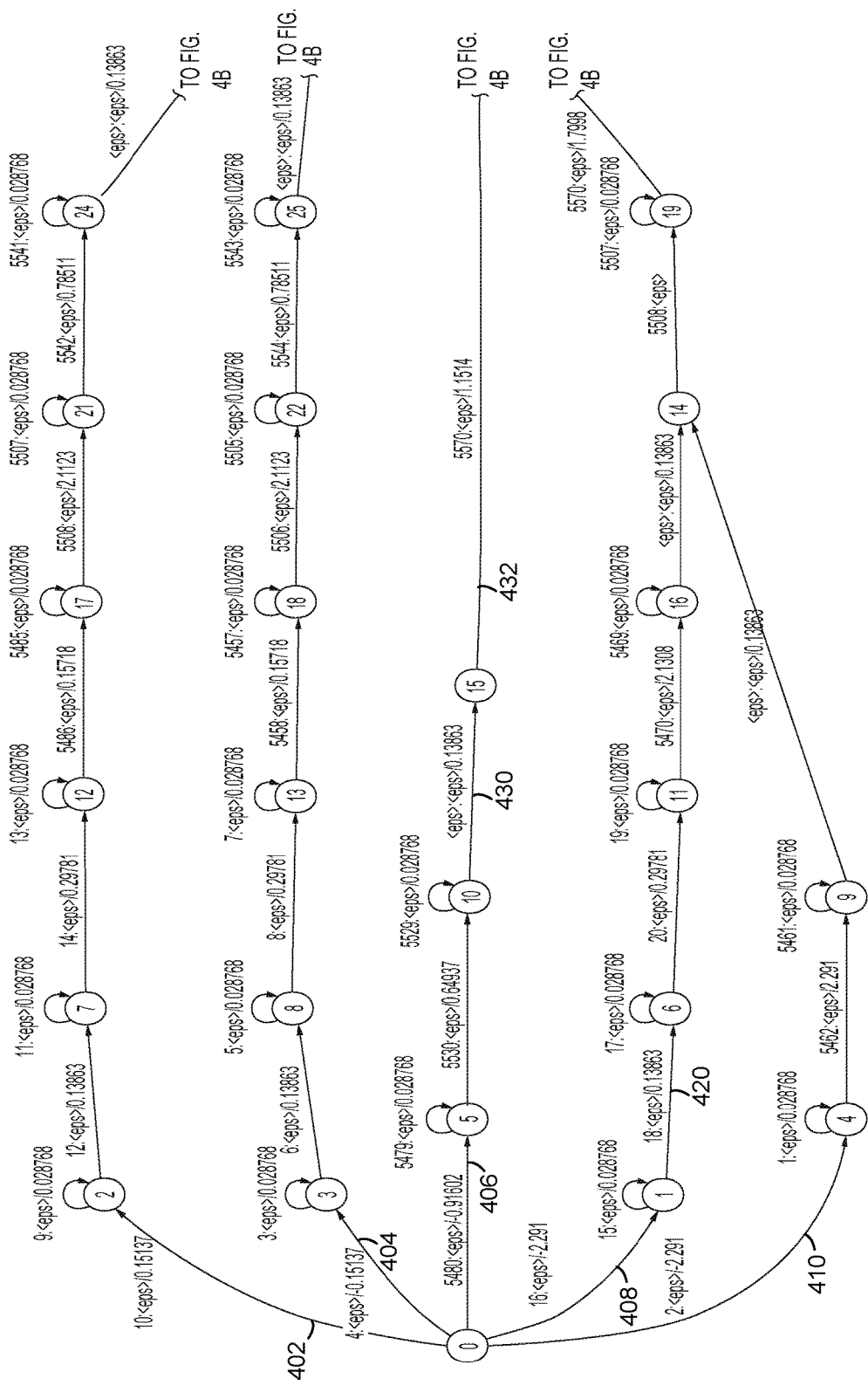
FIGS. 4A-4D illustrate a section of a finite state transducer (FST) according to embodiments of the present disclosure.
Figure 4B:
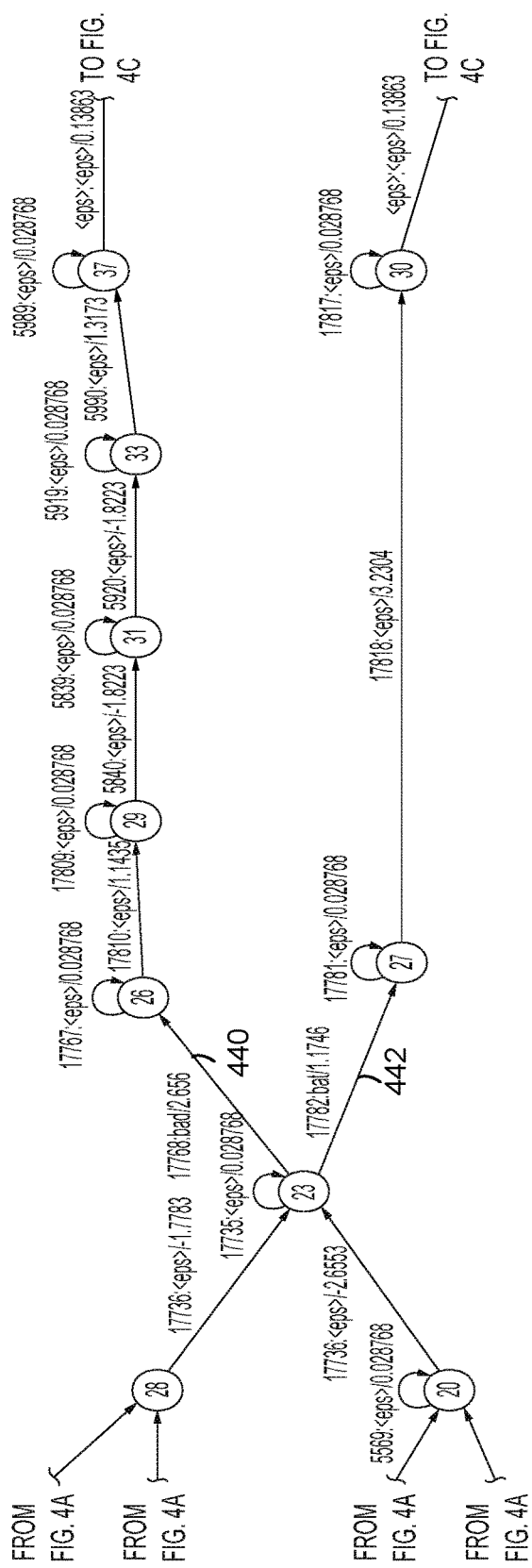
Figure 4C:
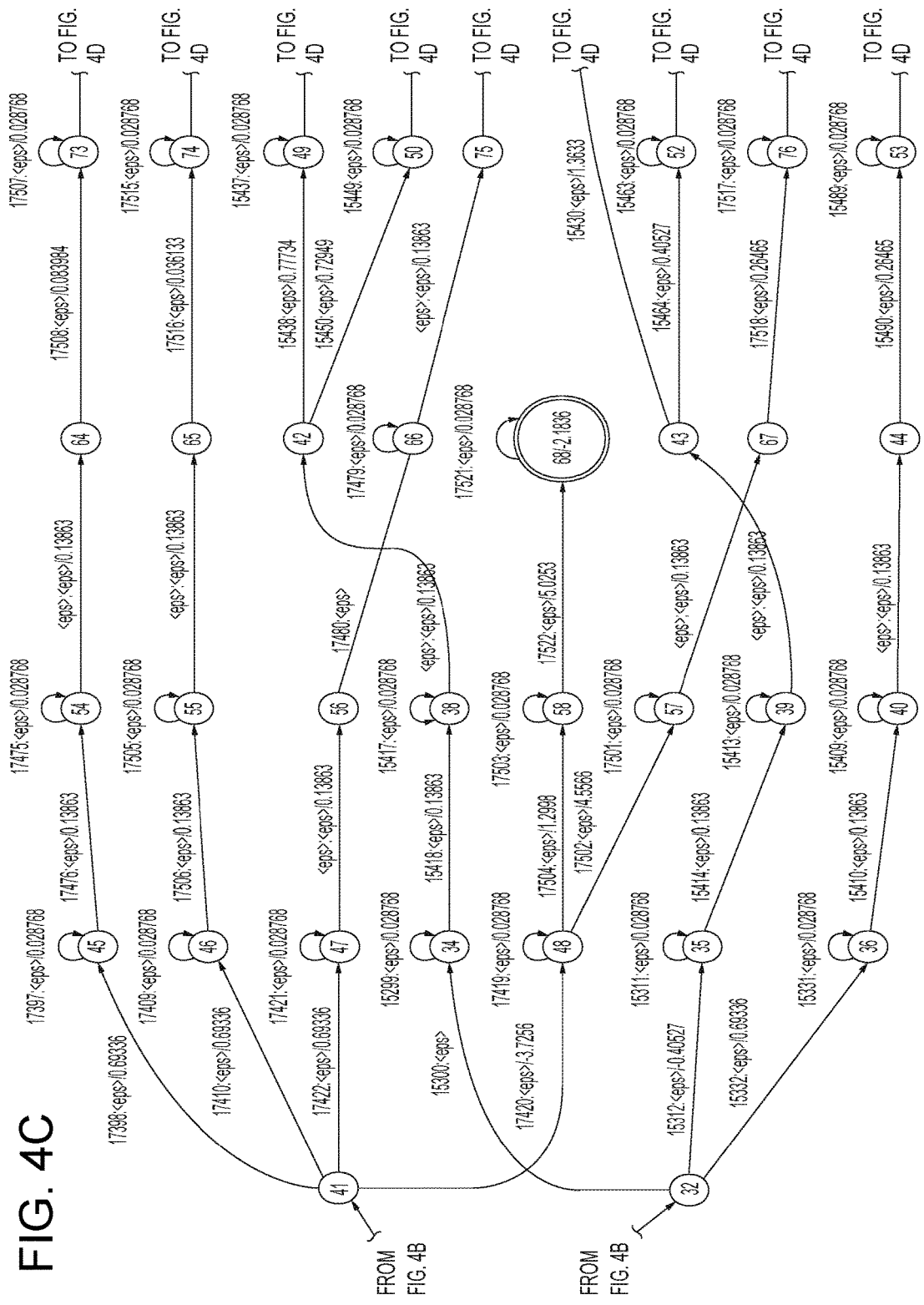
Figure 4D:
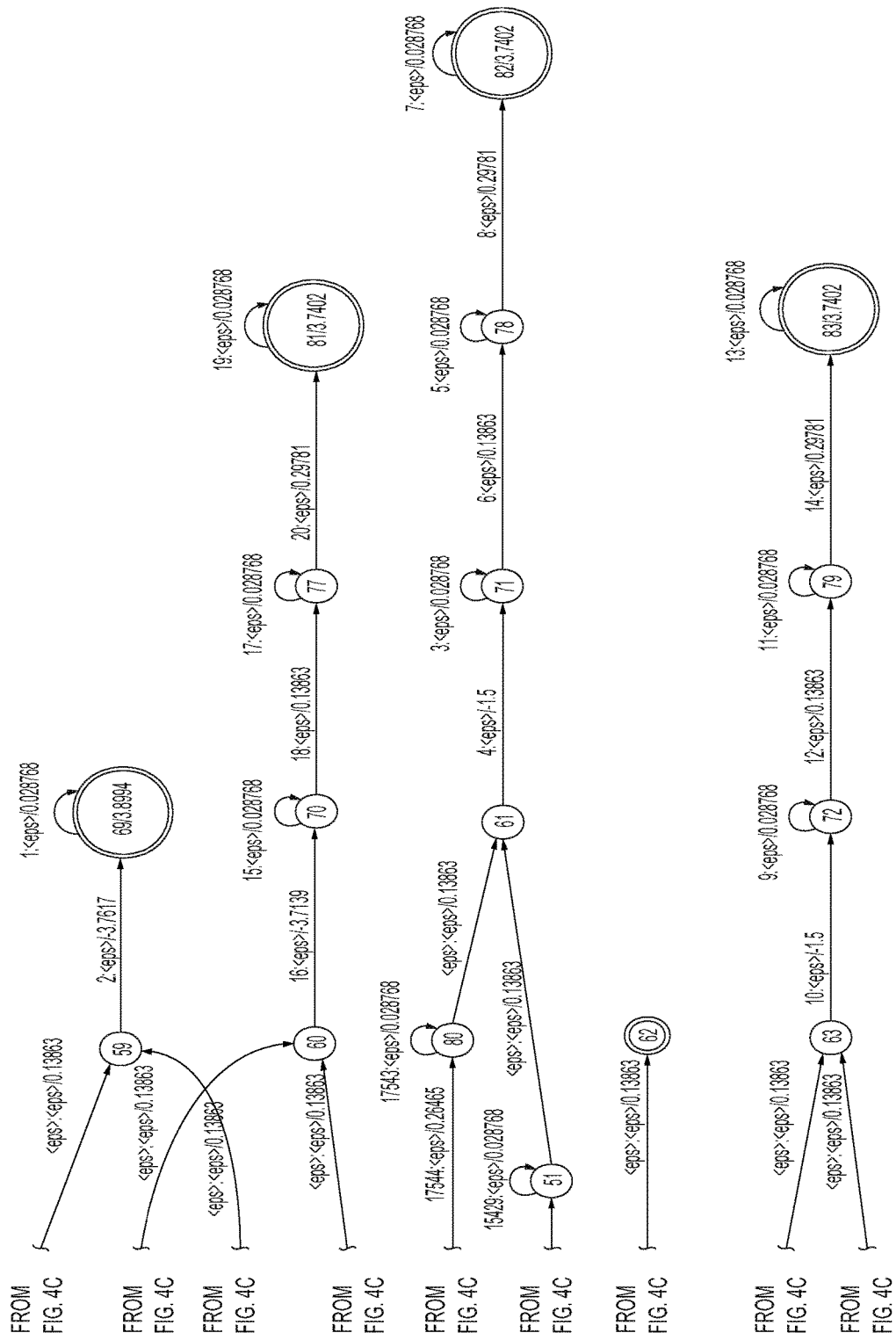

Take, for example, state 0 of FIG. 4A as an active state being considered as part of ASR processing. An incoming feature vector is received by the system and processed by the ASR engine 258 using acoustic model 253. The output of that processing may give certain scores for the acoustic units represented in the input labels of the arcs outgoing from state 0, for example:

unit 10, acoustic score $s_1$
unit 4, acoustic score $s_2$
unit 5480, acoustic score $s_3$
unit 16, acoustic score $s_4$
unit 2, acoustic score $s_5$ The ASR engine 258 may then take acoustic score $s_1$ and use it to adjust the existing score (0.84451) of arc 402 (which corresponds to unit 10). The scores may be added together, multiplied, or any other technique of combination. The resulting combined score may then be maintained by the system as the processed score corresponding to arc 402. The same process may be performed for each of the arcs outgoing from state 0 (as each of them have an input label corresponding to an acoustic unit) based on the scores corresponding to the acoustic units of their respective input labels, thus resulting in:

Updated score for 402=0.84451+($s_1$*sf)

Updated score for 404=0.84451+($s_2$*sf)

Updated score for 406=−0.22287+($s_3$*sf)

Updated score for 408=−1.5979+($s_4$*sf)

Updated score for 410=−1.5979+($s_5$*sf)

where sf is a scaling factor configured to adjust the acoustic scores so that they can be added to the scores of the FST. The scaling factor may be based on the particular acoustic model and/or FST. The same scaling factor may also be used to adjust each of the acoustic scores.

The destination states for the arcs processed (for example, states 1-5), may then be held in memory while the ASR engine 258 processes the next incoming feature vector corresponding to the next audio frame. The above process will then be repeated, so the acoustic model processing will output acoustic units with corresponding scores, the engine 258 will identify the corresponding units in input labels in arcs outgoing from FST states under consideration by the engine 258, the combines scores will be determined and stored. The process will continue in this manner for all input audio.

As the ASR engine 258 traverses the FST it will continue traversing states and arcs until it reaches a state with an outgoing arc, where the outgoing arc includes an input label corresponding to an acoustic which, which thus means the arc requires new information from the acoustic model to be traversed. For example, the ASR engine 258 may continue to traverse arcs until it arrives at an arc that has an input label corresponding to an acoustic unit. The ASR engine 258 will then wait for the next feature vector to be processed and for further input to come from the acoustic model until it continues processing. In this manner the ASR engine will perform time-synchronous decoding and will only consider portions of the FST in a frame-by-frame manner. That is, all the portions of the FST being processed at a particular time will all correspond to the same input audio frame/feature vector.

Further, as the ASR engine 258 traverses the FST, it may accumulate the combined scores for each path of the traversed nodes and/or arcs traversed up to each point in the FST. The combined score may be a sum of the updated scores (i.e., post acoustic model scores) of each state and/or arc traversed. For example, referring to the portion of the FST shown in FIG. 4A, if the ASR engine 258 has traversed along five paths to the point where it is currently at states 7, 8, 10, 6 and 9, each path will have a combined score leading up to the that point in the path. That is, the combined score for path 1 (currently at state 7) will be the summed updated scores for the nodes and arcs leading from state 0 to state 7, the combined score for path 2 (currently at state 8) will be the summed updated scores for the nodes and arcs leading from state 0 to state 8, the combined score for path 3 (currently at state 10) will be the summed updated scores for the nodes and arcs leading from state 0 to state 10, the combined score for path 4 (currently at state 6) will be the summed updated scores for the nodes and arcs leading from state 0 to state 6, and the combined score for path 5 (currently at state 9) will be the summed updated scores for the nodes and arcs leading from state 0 to state 9.

As the ASR engine 258 operates, there are certain pruning settings that affect how many states the ASR engine 258 may consider. One such pruning setting is the beam width. The beam width is a measurement of the score difference between a best scoring state (corresponding to the particular audio frame being processed) and the cutoff point. Any states outside the pruning settings will be discarded and not considered during further ASR processing.

When the ASR engine 258 has completed processing for a particular feature vector, that is the ASR engine 258 has processed the output from the acoustic model for the feature vector and rescored all the arcs and states corresponding to the acoustic units/scores output by the acoustic model (while discarding those that fall outside the beam width), there may be a certain number of states left within the beam that have received their combined scores. (Though note that not every state/arc will receive a combined score, only those that correspond to acoustic units seen by the AM will receive a combined score.) As the ASR engine 258 will continue to traverse arcs and states until a new acoustic unit is indicated as an input label, the states remaining after processing data for a particular audio frame will have outgoing arcs that correspond to an acoustic unit. Those outgoing arcs for those states will then be considered by the ASR engine 258 as new data for the next feature vector comes from the acoustic model processing.

As the ASR engine 258 traverses the FST it may store data corresponding to the states and arcs traversed along with their combined scores. That may include a table of entries, sometimes called tokens, where each token corresponds to a state in the search space (i.e., the traversed portions of the FST that fell within the beam width and the threshold number of active states). Each token may include a score representing the likelihood that the state is reached from the beginning of the utterance up until the frame of the state. The token may also include a pointer in the table to a previous state, such as the state most likely to lead to the present state, and the arc from the most likely previous state to the present state. The token may also include the input label and output label (if any) of the arc that leads from the most likely previous state to the present state. The input label and/or output label may be a pointer to a table of labels and may indicate a phoneme, senon, word, or other speech unit. The token may also include links to more than one previous state (and corresponding scores, arcs, labels, etc.).

Figure 5:
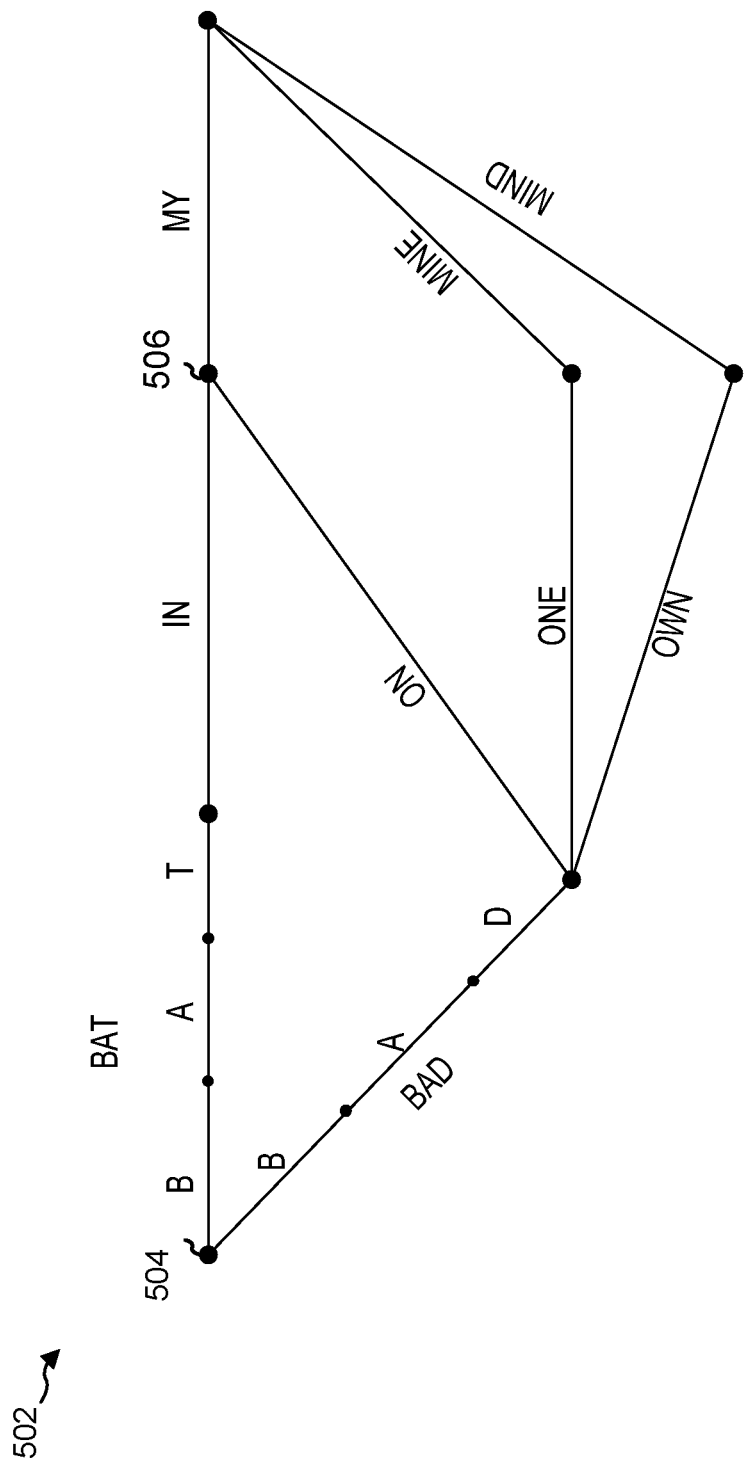
FIG. 5 illustrates a word lattice according to embodiments of the present disclosure.

As the ASR engine traverses portions of the FST, it may use the table of tokens representing the states and arcs traversed, along with their combined scores, to create a lattice of potential paths representing potential ASR results. A sample lattice is shown in FIG. 5. The lattice 502 shows multiple potential paths of speech recognition results that may have been determined by the ASR engine 258 by traversing an FST or by using different acoustic model/language model processing. Paths between large nodes represent potential words (for example "bad", "bay", etc.) and paths between smaller nodes represent potential phonemes (for example "B", "A", "T", and "B", "A", "D"). For purposes of illustration, individual phonemes are only shown for the first two words of the lattice. The two paths between node 504 and node 506 represent two potential word choices, "bat in" or "bad on". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the ASR engine 258 as the ASR result for the associated feature vectors. Following ASR processing, the ASR results may be sent to a downstream component, such as a command processor 290 for further processing (such as execution of a command included in the interpreted text). Thus the data preserved by the ASR engine 258 during traversal of the FST may result in a lattice representing the most likely possible ASR results (as the least likely results were discarded during pruning). The mostly likely path of the ASR results, sometimes called the Viterbi path, may be selected as the top scoring result for command execution.

As may be appreciated, larger FST may result in higher quality ASR results. The entire speech processing timeline, however, from initial receipt of the user's spoken command, to eventual execution of that command as noticed by the user may take a significant amount of computing resources to complete. Thus, to ensure desired results, the size of the combined FSTs may be large, which may increase latency and memory needed to perform ASR tasks. To reduce the size of the FST, FST compression techniques, such as those described below may be used. The techniques will allow the reduction in the size of the universe of the FST that is being searched using a general domain input. Reducing the FST size will reduce latency and streamline the speech recognition process.

FSTs can constitute the bulk of an ASR model, with HCLG being particularly large, sometimes reaching tens of gigabytes in some models. G itself may be smaller, in the order of hundreds of megabytes. When the language model G is fully known at model build time and is not too large, all four FSTs can be composed statically into a single transducer HCLG. Otherwise, the composition has to happen dynamically, at runtime (i.e., when the system is taking in audio for ASR processing). In the latter case, three FSTs H, C, and L (HCL) may be combined at model build time, while the composition of the HCL FST and the G FST happens at runtime. This configuration may be useful, for example, when using customized grammars, G. For example, a grammar G may be customized for a particular user. Certain user-specific language models, for example, may be G FSTs.

Figure 4E:
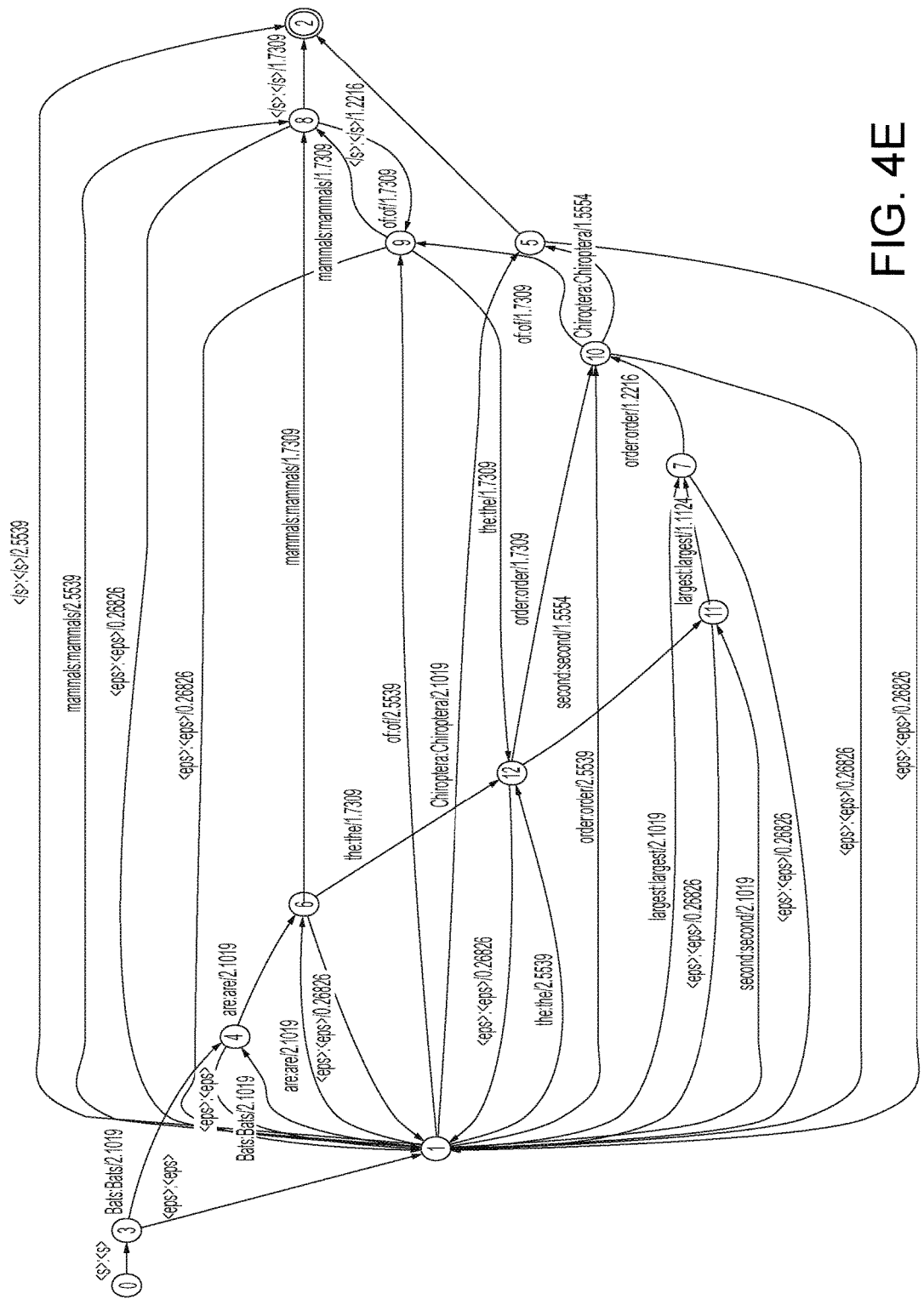
FIG. 4E illustrates a section of an FST according to embodiments of the present disclosure.

An example of a portion of a G FST is shown in FIG. 4E. The FST potion shown in FIG. 4E is a portion of a G FST language model constructed from two sentences, the first being "bats are mammals of the order Chiroptera" and the second being "bats are the second largest order of mammals." The portion of the FST shown in FIG. 4E may normally appear in a much larger FST as part of a general ASR language model, but is shown in FIG. 4E for purposes of illustration. Further, while a complete G FST may be configured to recognize any sequence of the words shown in FIG. 4E, the particular illustrated sequences may be more likely due to the construction of the FST (which itself is based on a universe of available text from a text corpus). To traverse the G FST, word outputs from an HCL FST (or other model configured to construct words from sounds output by an acoustic model) are used to determine which arcs to traverse along the G FST. As arcs are traversed, word output labels associated with those arcs are output to form the potential text output that is eventually output as the ASR result. Multiple paths through a G FST may be traversed (with respective scores) thus resulting in an N-best list output of a word string (e.g., a sentence) that potentially represents the input audio data.

Although an FST is a graphical construct as shown in FIGS. 4A-4E, when stored as data in the system, an FST may be represented as data in two or more tables. Such tables may be data structures (of various forms) that list information about the nodes/arcs in an indexed form. The two tables include a table of states (also called nodes) and a table of arcs. The FST may optionally include a table of input labels and a table of output labels for particular arcs, though those label tables may be stored separately (and thus not be considered part of) the FST. Though this is configurable. As an example, the state/node table may contain a record for each state/node, with each state record consisting of the following four fields:
   (1) Final weight of the state,
   (2) Offset in the arc array pointing to the beginning of the list of arcs outgoing from the state,
   (3) Number of outgoing arcs from the particular state with an epsilon (E) input label, and
   (4) Number of outgoing arcs from the particular state with an epsilon (E) output label.

Each of these fields may be represented by a particular N-bit integer (e.g., 16, 32, etc.). The integer size for a particular field may be different from that of a different field. Further, depending on system configuration, certain fields may be removed (for example fields 3 and 4) while other fields may be included.

Thus, to represent a state with many outgoing arcs (for example, state 0 in FIG. 4A) the table entry for state 0 would include a final score of state 0, a pointer to the arc table corresponding to an arc table entry for a first arc outgoing from state 0 (for example 402), a number of outgoing arcs from state 0 with a null epsilon input label and a number of outgoing arcs from state 0 with a null epsilon input label. As FIG. 4A is an incomplete portion of an FST, it does not illustrate all the arcs from state 0 and thus does not show all the arcs containing an epsilon label. Although the entry for state 0 may only include a pointer to a first outgoing arc from state 0, the arc table and state table may be organized so that the entry in the state table for the next state, e.g., state 1, includes a pointer to the arc table for the first outgoing state from state 1, e.g., arc 420. The system may thus determine that any arcs from 402 up to, but not including 420, are outgoing from state 0.

The arcs table may contain the following information for each arc:
(1) Arc weight,
(2) Next state ID (the end point of the arc)
(3) Input label (which may be an index or pointer to a label in a table of input labels)
(4) Output label (which may be an index or pointer to a label in a table of output labels)

Each of these fields may be represented by a particular N-bit integer. The integer size for a particular field may be different from that of a different field. Thus, to represent a particular arc, for example arc 420, the entry in the arc table may include an arc score (e.g., 0.13863), the next state ID for the arc (e.g., state 6), the input label (e.g., a pointer in a table of input labels to input label 18, which may correspond to a particular acoustic unit), and the output label (which is epsilon and thus may be blank, or set to a particular value that represents epsilon, or may point to an entry in the table of output labels that represents epsilon).

A language model, such as a language model FST of the kind illustrated in FIG. 4E, or other language model, allows the system to recognize sequences of words that are likely to appear together. Typically, an ASR system uses a general language model to process incoming utterances from a variety of users. The general language model may include an input symbol table (for input labels on an FST arc), an output symbol table (for output labels on an FST arc) and a grapheme-to-phoneme model (G2P) to handle out of vocabulary words. To customized ASR operations, however, supplemental language model(s) may also be used at runtime along with the general language model to allow the system to recognize sequences of words that may not be generally applicable, but may be applicable in certain instances or for certain users (for example, to allow the system to recognize "smells like teen spirit" as valid sequence of words for a user's music catalog even though the sequence is unlikely to appear in general parlance text that was used to train a general language model).

Specific supplemental language models are typically generated depending on the general language model they are likely to be used with. This allows for certain efficiencies and resource sharing, such as references to common word or N-gram (i.e., word sequence) tables. Unfortunately, the dependence of a supplemental language model on the general language model means that whenever a general language model is updated the existing supplemental language models become outdated and must be rebuilt.

To solve this problem, offered is a new way to construct supplemental language models. In particular, the system may generate supplemental models that are independent of the general system language model. At runtime (i.e., recognition time when an utterance is received and processed), the ASR engine 258 may reconcile these independent supplemental models against the system language model to produce a consumable FST/language model (LM). This may reduce or eliminate the need for supplemental language model rebuilds prior to deploying a new system language model (also called the static model or system LM). The updated supplemental language models may also be backwards compatible with existing ASR systems.

Figure 6:
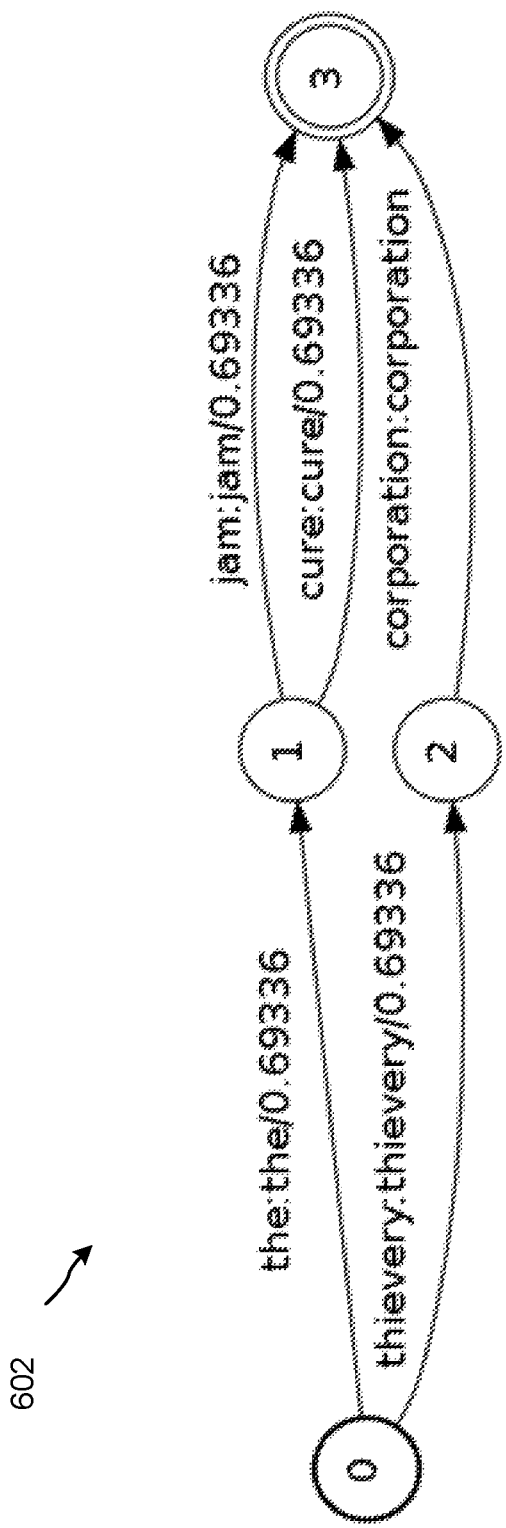
FIG. 6 illustrates a user-specific FST corresponding to a sample music collection with words as arc labels according to embodiments of the present disclosure.

To explain the operation of a new supplemental model, consider a simply LM representing a music library with just three artists: The Jam, The Cure, and Thievery Corporation. Assume a user requests to play them in a ratio of 1:1:2, respectively. The music library may be represented as an FST shown in FIG. 6. As with the FSTs of FIGS. 4A-4E, the example FST arcs of FST 602 are annotated in the form of [input label]:[output label]/[score]. Scores are weights represented in the negative log space. To convert to a probability, a function such as exp(-score) may be used. Scores omitted from arcs represent no branching from the source node to the destination node (thus implying the arc will always be traveled from source to destination).

The illustrated FST 602 is merely notional, as a real FST may not embed text strings but rather may instead uses integer labels, where the integers are indices to words in a symbol table. This saves space and abstracts away from character encoding issues. A system LM defines input and output symbol tables that may replace text strings with labels on the FST. Thus, a more realistic FST 702 may be illustrated in FIG. 7. As shown, FST 702 includes arc labels of numbers such as "72579" and "124969" are integer indices referring to a table.

When the system writes these integer labels into a supplemental model FST, it typically ties the FST to the specific symbol tables in a particular system LM version. This is illustrated in FIG. 8A. As shown in FIG. 8A, a system LM 820 may have a corresponding input label table 822 and a corresponding output label table 824 where the arcs on the system LM 822 include input and output labels that are indices to the respective label tables 822 and 824 respectively. The specific label tables 822 and 824 are specific for the particular version of the system LM 820, in this illustration, version 1.0. Further a user specific LM 810 may also include input and output labels that are indices to the respective label tables created for the system LM, 822 and 824 respectively. As shown in FIG. 8B, many different user specific LMs (shown as 810a through 810n) may also reference the system LM tables 822 and 824. Having many different user specific LMs referencing the same system LM tables 822 and 824 may make it easier to construct the user specific LMs in the first instance.

At runtime, the user-specific LMs are incorporated into the system LM, which may have designated arcs or states to incorporate word sequences of the user-specific LM. The label indices output by the acoustic model are then matched to the label indices of the LMs to traverse the LMs and ultimately determine hypotheses corresponding to the utterance.

Figure 9:
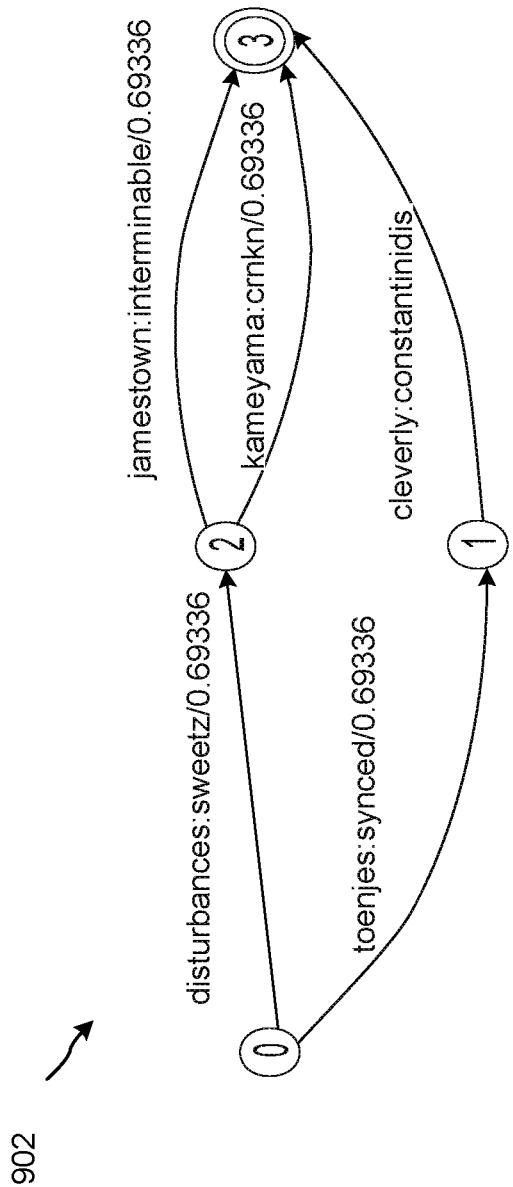
FIG. 9 illustrates a user-specific FST with mismatched arc labels that may result from a user-specific FST being used with an updated version of a system FST according to embodiments of the present disclosure.

But symbol tables can change between versions of the system LM. When a new version of a system LM is released (where the new system LM version may include different words, and therefore different tables, from the previous system LM version), the integer labels may no longer correspond to the same words in the previous system LM version. For example, FIG. 9 may illustrate how the FST 72 maps to words when the indices of 702 are matched to tables for a different version of the system LM (for example, version 1.1) than the version of the system LM (for example version 1.0) that the FST 702 was originally configured for. As can be seen, the FST 902 results in words corresponding to label arcs that are incorrect and, depending on the differences between the system LMs, may be nonsensical. This is one reason why supplemental models currently need to be rebuilt with a new system LM version. Referring again to FIG. 8B, if a new version of the system LM 820 is created, which may result in new version of the input and output label tables 822 and 824, then all the labels on the arcs of the user specific LMs may become incorrect, thus requiring rebuilding of all the user LMs 810*a* through 810*n* (where n represents the number of user specific LMs of the system 100, which may number in the millions).

Figure 10:
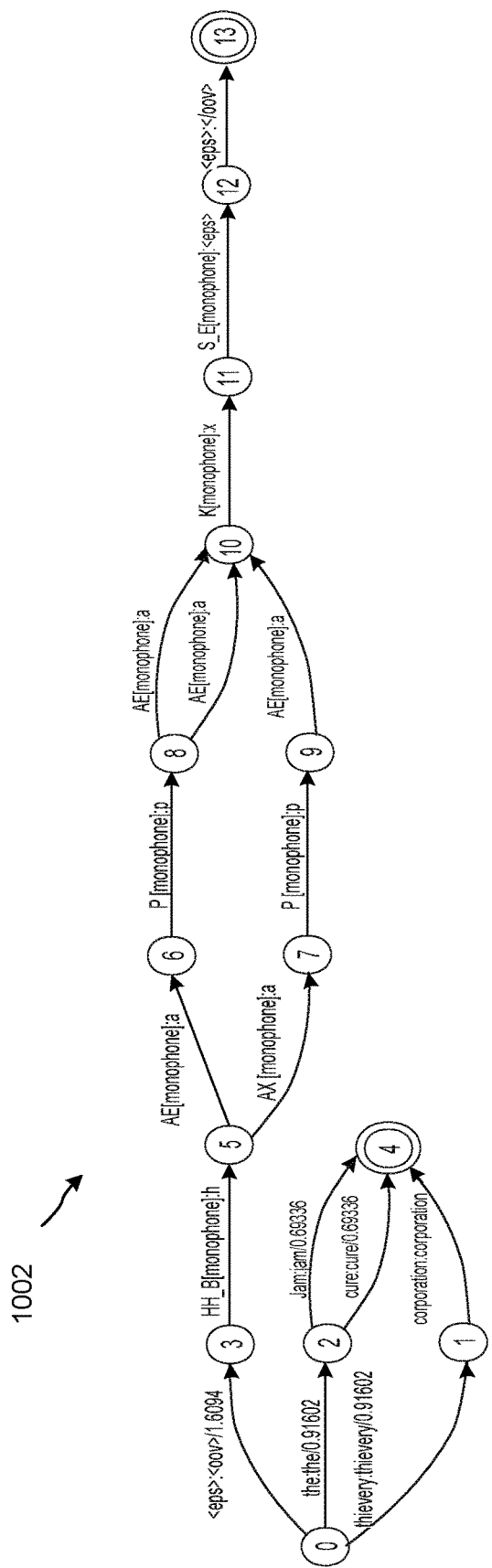
FIG. 10 illustrates an FST showing how a sequence of phonemes is transduced to a sequence of graphemes according to embodiments of the present disclosure.

A second reason such rebuilds are required is due to how the system handles out-of-vocabulary (OOV) words. Certain terms in a customer's personalization data—uncommon proper names for instance—may not exist in the "vocabulary" of a system LM. To deal with this, the static model provides a grapheme-to-phoneme (G2P) model that guesses pronunciations from spellings. If the system encounters text that it cannot find in the system LM's vocabulary, it uses the G2P model to generate a pronunciation FST and inserts it into the supplemental model. FIG. 10 shows an example of this 1002, but with the OOV artist name "Hapax" added to the music library. Strings <oov> and </oov> are tags marking, respectively, the beginning and end of an OOV word. FST 1002 shows how a sequence of phonemes is transduced to a sequence of graphemes (characters) that spell the word. The system uses the G2P model to create FST 1002 representing the possible ways the G2P model determines the example word "hapax" may be pronounced. As shown in FST 1002, the input labels are phonemes and the output labels are characters, thus the FST 1002 transduces input phonemes to an output character string that may spell the word "hapax". Thus OOV handling adds two new dimensions of supplemental model dependence on the system LM. In the first place, what is considered OOV depends on the vocabulary defined by the system LM—which changes between system LM. In the second place, the system depends on the system LM's G2P to generate the pronunciation for OOV words.

Figure 11A:
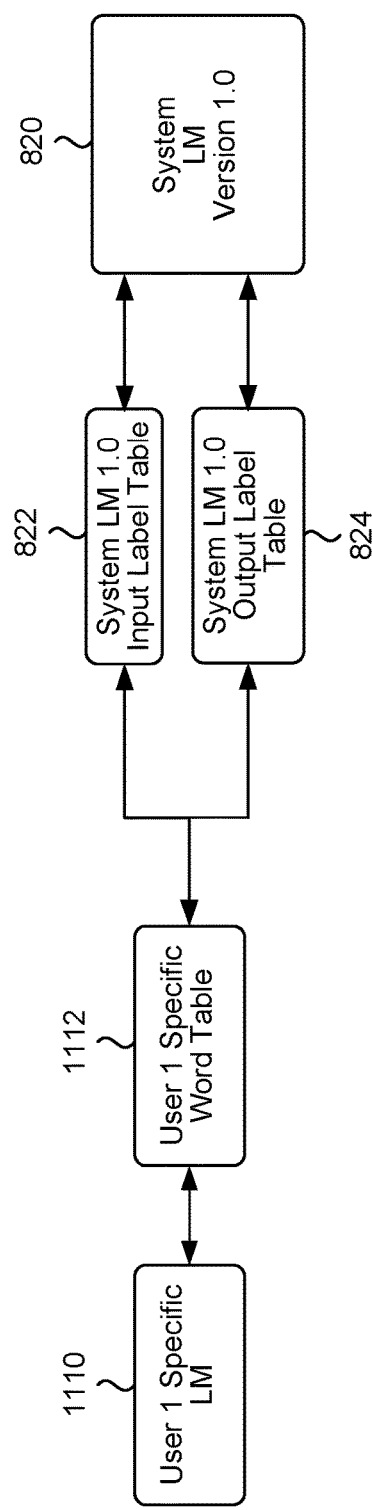
FIGS. 11A and 11B illustrate user-specific language models with user-specific word tables that reference input and output label tables configured for a particular system LM FST according to embodiments of the present disclosure.
Figure 11B:
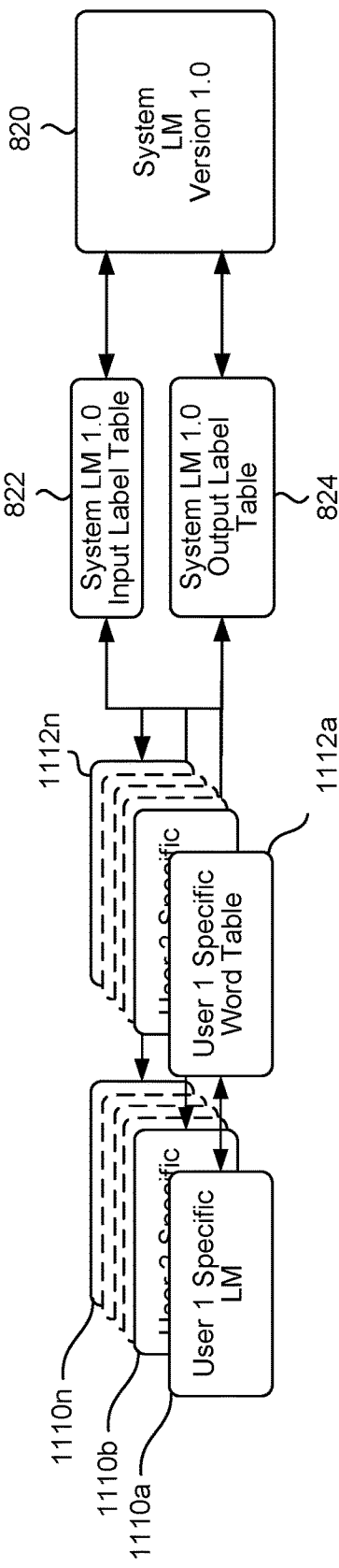

To solve the above problems, the system may attach to each supplemental model "local" input and output symbol tables mapping all integer labels present in the supplemental model FST back to text strings. Then, at runtime, the supplemental model may be relabeled against the deployed system LM by mapping each input/output integer label on the supplemental FST to a word via the user-specific input/output symbol tables, mapping this word to a new label via the system model input/output symbol table, and swapping the old and new labels on the FST. Examples of the new construction of user specific LMs is shown in FIGS. 11A and 11B. As used herein, the term user-specific to refer to something such as LM, FST, word-table, etc. may mean the item is associated with a particular user, user profile, user account, user ID, or the like.

As shown in FIG. 11A, a user-specific LM 1110 may include indices that refer to a user-specific word table 1112. The user-specific word table 1112 includes words that are referenced in the user specific LM 1110. The user specific LM 1110 and table 1112 may be created by identifying word strings associated with the user (for example, from information from the user's music collection. At the time the user specific word table 1112 is created it may include references to the original system label tables 822 and 824, where an entry for a word listed in user-specific word table 1112 includes indices to the same word in the original system label tables 822 and 824. Alternatively, the user-specific word table 1112 may not include any indices to the system label tables, and the system would perform word matching at runtime, as described below. Thus, as shown in FIG. 11B, each user-specific LM (1110*a*-1110*n*) may include references to its own user-specific word table (1112*a*-1112*n*). In this configuration, if the system LM and input/output label tables are updated to new versions, the user specific LMs 1110 may remain unchanged. Only the user specific word tables 1112 may need to be updated, which is a simpler and less resource intensive process.

Further, instead of inserting pronunciation FSTs directly into the supplemental model for OOV words, the system may create a special kind of arc representing both the word itself (on the input side) and a reference to the pronunciation FST generated from some G2P model (on the output side). At runtime, the ASR engine 258 can "replace" this arc with the pronunciation FST if the underlying word remains OOV with respect to the deployed system LM, or simply rewrite the arc as a "normal" arc if the underlying word is in the vocabulary. Alternately, if a normal arc in the supplemental model refers to an OOV word in the deployed static model, the engine can generate the pronunciation FST on-the-fly and replace the arc. Thus, for any static model package supporting personalization, a supplemental model can be used with any system LM version.

Figure 12:
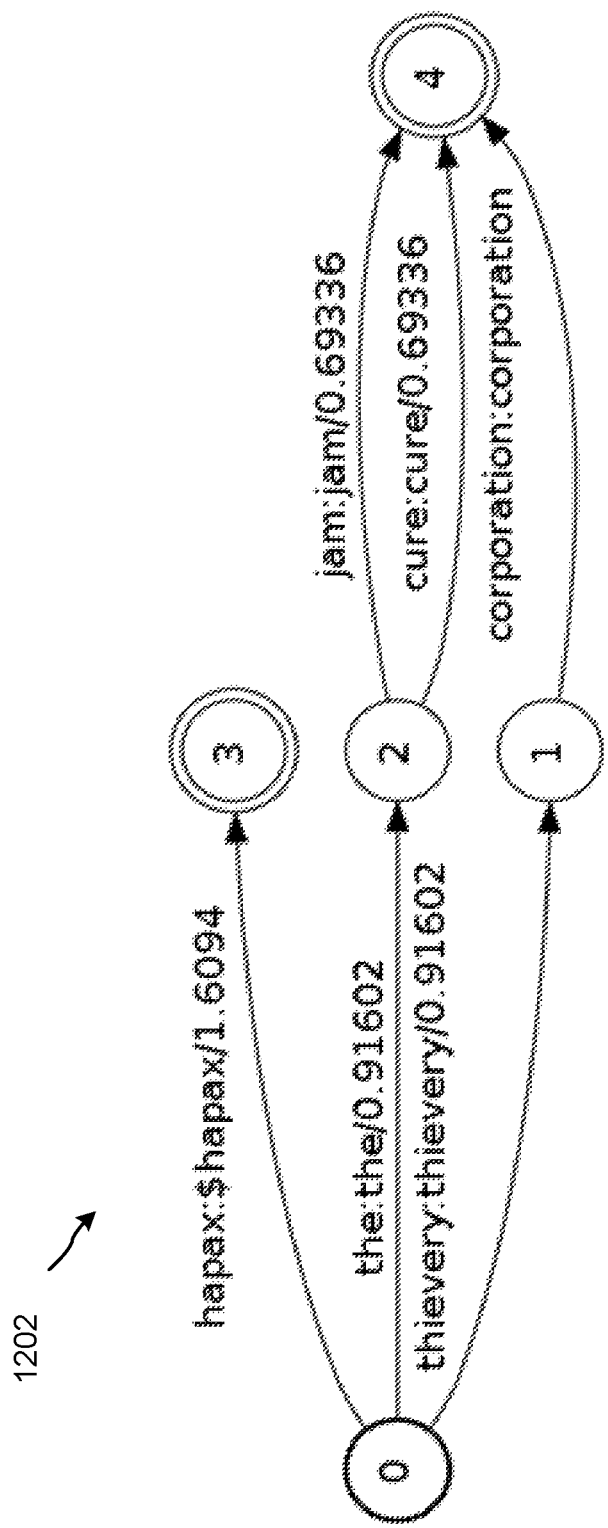
FIG. 12 illustrates a user-specific FST corresponding to a sample music collection with words as arc labels and including a reference to an out-of-vocabulary word pronunciation according to embodiments of the present disclosure.
Figure 13:
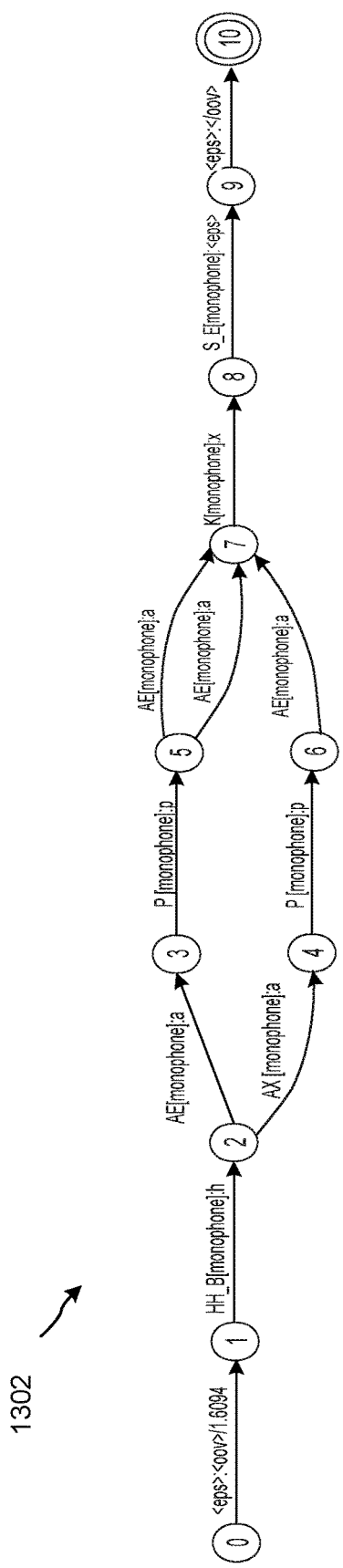
FIG. 13 illustrates an FST showing how a sequence of phonemes is transduced to a sequence of graphemes according to embodiments of the present disclosure.

For example, FST 1002 of FIG. 10 may be compiled as shown in FST 1202 in FIG. 12. As can be seen the FST 1202 is not very different, except that instead of inserting the pronunciation into the supplemental model directly, only a reference is inserted. As shown, the arc from node 0 to node 3 includes an input label of "hapax" and an output label of "$hapax" which may be a reference to an OOV pronunciation FST, such as portions of FST 1002. Thus for FIG. 12, the pronunciation is output as a separate FST 1302, shown in FIG. 13, that may be stored into the same personalization user profile or other storage of the system, to be accessed at runtime and potentially merged with the system LM and/or relabeled user-specific LM as needed. In most scenarios the G2P process for the user-specific LM is run at training time for each word of a user-specific LM that is OOV of the system LM at the time the user-specific LM is built. Though in some scenarios (discussed below) the G2P process may run at runtime when an utterance is being processed, particularly when a word is in-vocabulary when the user-specific LM is built but is OOV at runtime.

The system may also generate "local" input and output symbol tables for the supplemental model. These symbol tables may share "in-vocabulary" symbols like "the" and "corporation" but OOV words like "hapax" may appear as normal text in the input table and as a reference to a pronunciation FST on the output side. The pronunciation FST may also have its own symbol table as well (which may be merged into any symbol tables also associated with a corresponding supplemental model). The system may then package the supplemental model, the pronunciation FST, and the symbol tables (e.g., customized LM data) into storage in a linked manner.

At runtime, the system may fetch the customized LM data and provide it to the ASR engine 258 for processing. If, after storage, at some future point in time the system LM (and its tables) are updated, the individual supplemental model FST need not be changed, but rather a reconciliation table or other model can be used to ensure the local tables match the updated general system language model tables. As a result, reconciliation of the customized tables with the new tables for the system LM is much less resource intensive than building entirely new supplemental models (which would have referenced the system LM tables directly, rather than referencing the local tables like the above proposed supplemental models).

For OOV words, because the ASR engine 258 has access to both the normal text of any word (via the "local" input symbol table) and the pronunciation FST (via the artifact or G2P), it can determine whether or not any word is in the vocabulary of the current system LM and either use a normal arc, or "replace" it with the pronunciation FST, respectively.

For OOV, there are four possibilities that may describe an OOV word. In the first possibility a word that was OOV when the user-specific LM was built may now actually be included in the system LM (as represented by the system LM label tables) at runtime). For example, when the user-specific LM was built the system LM may have been at version 1.0 and may not have included the word "hapax". Thus, the system may have generated FST portions using the G2P process described above. However at runtime the system LM may be at version 1.1 and may now include the word "hapax". At runtime the system may perform a text string match between the words of the user-specific word table 1112 and the updated system LM label table(s). In the example, a match may be detected regarding the word "hapax". In this scenario the system may use the pronunciation associated with the system model (which may be part of an HCLG FST) as the system model may have a more robust model of the pronunciation of the originally OOV, but now in vocabulary word (e.g., "hapax") than the user-specific LM had using the G2P process. Thus, for words that are OOV when the user-specific LM was built but are in-vocabulary at runtime, the system may use pronunciations associated with the system LM.

In the second possibility, a word that was OOV when the user-specific LM was built remains OOV in the system LM at runtime. In this scenario, the system may perform a text string match between the words of the user-specific word table 1112 and the updated system LM label table(s) and determine that the originally OOV word remains OOV. In this scenario the system will use the pronunciation determined using the G2P process above and may insert that pronunciation (such as the pronunciation represented by FST 1302) at runtime.

In the third possibility, a word that was in-vocabulary when the user-specific LM was built remains in-vocabulary in the system LM at runtime. This results in the straightforward relabeling between the user-specific word table and the system LM label table(s) as described herein.

In the fourth possibility, a word that was in-vocabulary when the user-specific LM was built has fallen OOV and is OOV in the system LM at runtime. While this may happen rarely, it may occur. In this scenario the system may operate the G2P process at runtime to determine an estimated pronunciation for the word and use that estimated pronunciation as described above. As G2P may be resource expensive, it is generally desired to run G2P processes when the user-specific LM is being built, but it may be done at runtime for unexpectedly OOV words. The system may log words that fall OOV and may track how often those words are recognized during various runtime operations. This may be helpful for various system metric operations.

Figure 14:
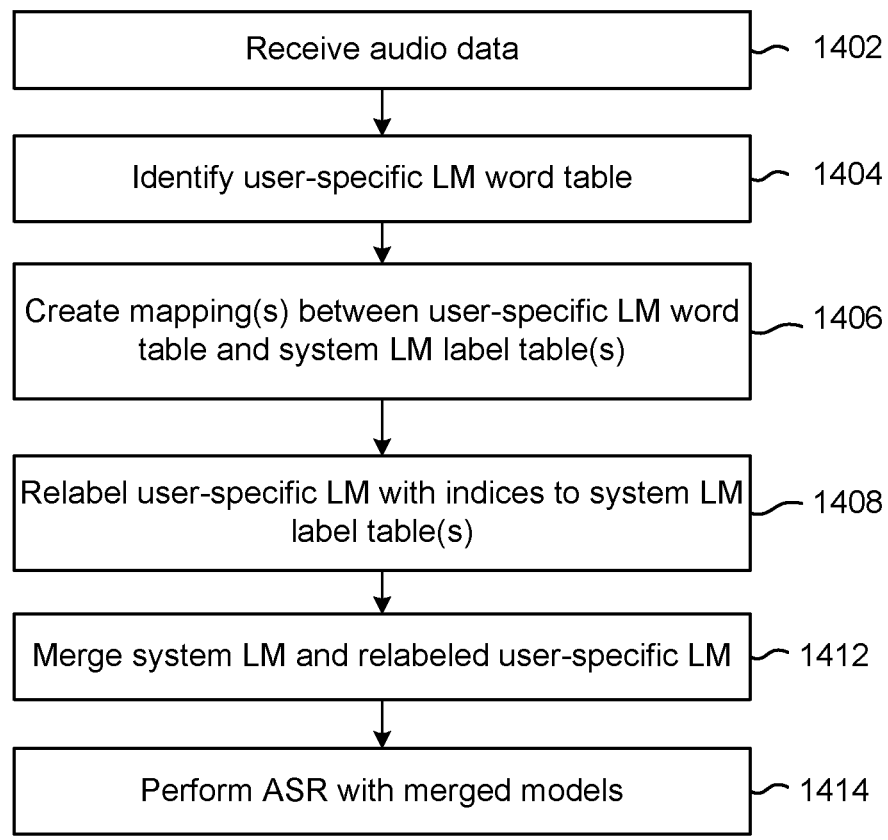
FIG. 14 illustrates a method for using user specific word tables according to embodiments of the present disclosure.

As shown in FIG. 14, at runtime the system may receive (1402) audio data corresponding to an utterance. The system may then identify (1404) a user-specific LM 1110 and user-specific LM word table 1112 corresponding to the audio data. This may be done by matching a device 110 (that sends the audio data 111 to the server 120) to the user specific LM 1110 and word table 1112, for example by using a user profile 1504, discussed below in reference to FIG. 15. The system may then create (1406) a mapping(s) between the user-specific LM word table and the system LM label table(s). This may be done by performing a letter-string match to determine where in the system LM label table(s) a particular word in the user-specific LM word table may be found. The system may then create a table mapping indices of the user-specific label table 1112 to indices of the system LM label table(s) 822 and/or 824. The system may then load the user-specific LM table 1112 into memory, only relabeled (1408) with the indices that now correspond to the system LM label table(s). Thus, a first user-specific LM table 1110 in storage (where the labels of the arcs of the first user-specific LM 1110 may include indices to the user-specific word table 1112) may become a second, relabeled, user-specific LM table in memory 1110' (where the labels of the arcs of the of the second user-specific LM 1110' may include indices to the system LM label table(s) 822 and/or 824, though the relationship between the arcs and states themselves may be the same between the first user-specific LM 1110 and the second user-specific LM 1110'). The system may then merge (1412) the system LM 820 and the second user-specific LM 1110' and may perform (1414) ASR using the merged models.

The second user-specific LM 1110' may also include arcs/labels that correspond to OOV words as described above. Thus the merged models may include portions of a pronunciation FST to handle a word that may appear in the user specific LM 1110, but not in the system LM label tables 822 and/or 824.

Using the above techniques, rather than having to recreate each user-specific LM every time the system LM is updated, instead at runtime the labels and references of a user-specific word table may be updated when audio data is received corresponding to the user-specific word table. Thus, the resource cost of updating is not borne up front and all at once, but rather spread out at runtime and only in instances when an utterance for a particular user must actually be processed.

Figure 15:
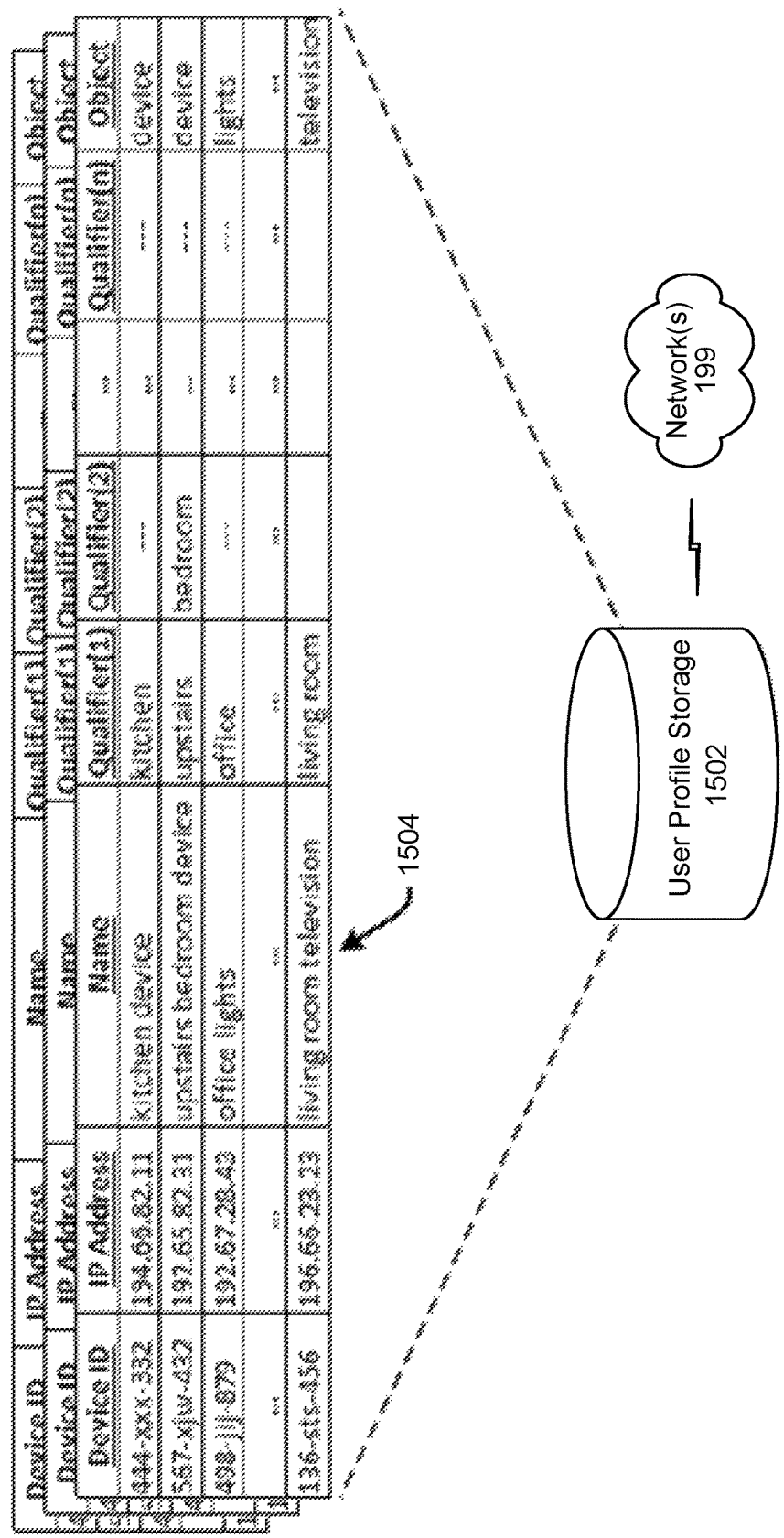
FIG. 15 illustrates data stored and associated with user profiles according to embodiments of the present disclosure.

The server 120 may include or reference data regarding user accounts, shown by the user profile storage 1502 illustrated in FIG. 15. The user profile storage may be located proximate to server 120, or may otherwise be in communication with various components, for example over network 165. The user profile storage 1502 may include a variety of information related to individual users, households, accounts, etc. that interact with the system 100. For illustration, as shown in FIG. 15, the user profile storage 1502 may include data regarding the devices associated with particular individual user accounts 1504. In an example, the user profile storage 1502 is a cloud-based storage. Such data may include device identifier (ID) and internet protocol (IP) address information for different devices as well as names by which the devices may be referred to by a user. Further qualifiers describing the devices may also be listed along with a description of the type of object of the device. For example, user preferences regarding commands can be stored by the server 120. Such user preferences can be used by the server 120 to answer queries as described herein. The user profile storage 602 may also include a customized grammar G/supplemental language model that may be used to process incoming ASR requests for a user profile associated with the user account. A single user account may have multiple user profiles, for example corresponding to different members of a household (e.g., a mom profile, dad profile, child profile, or the like). User profiles as well as user-specific LMs and corresponding word tables may typically be stored remotely, as in part of a cloud service or remote storage associated with a server 112. Though in certain circumstances such data may be stored with local device 110. The supplemental language models described herein may be associated with a particular user account, particular user profile, etc.

Figure 16:
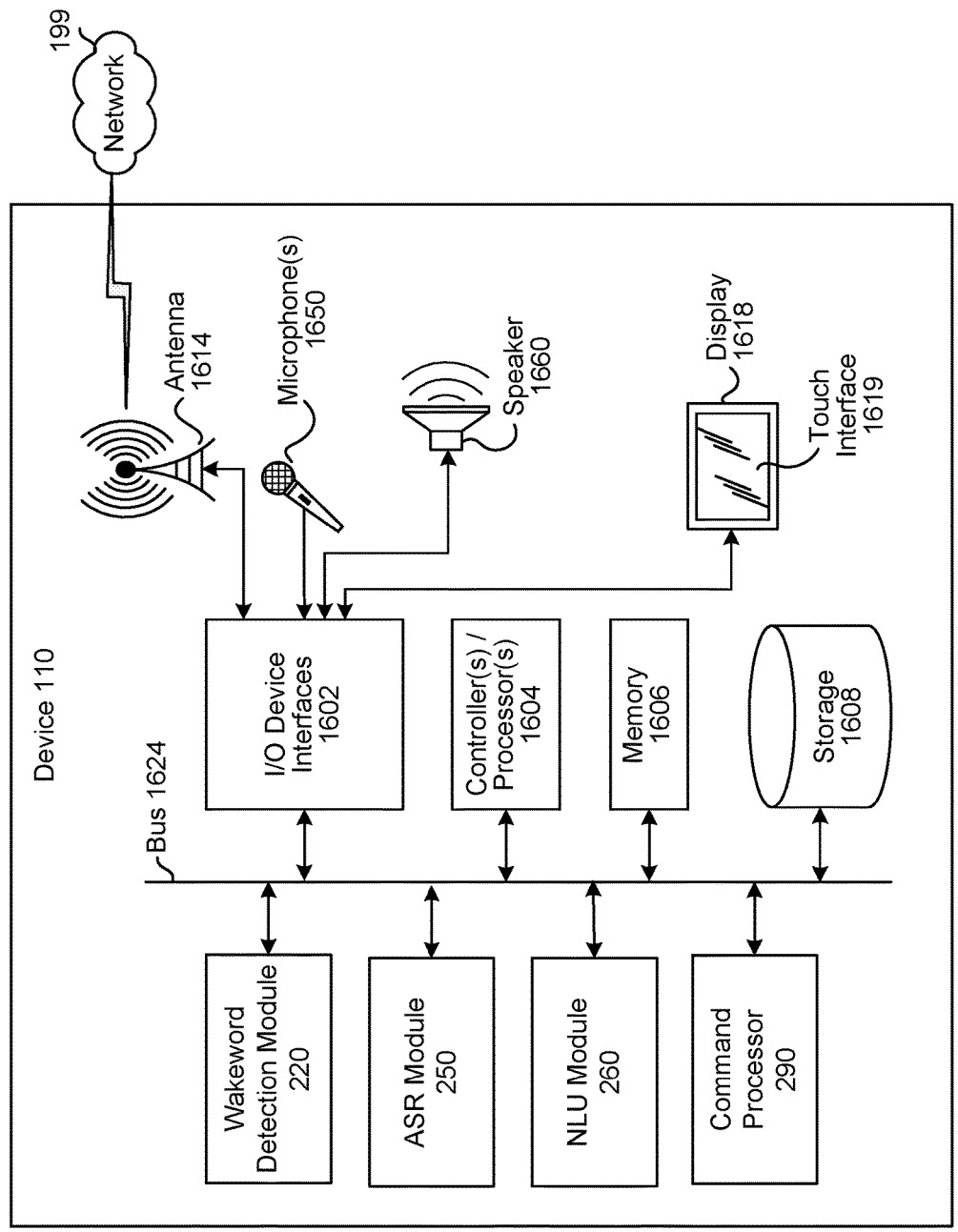
FIG. 16 is a block diagram conceptually illustrating example components of a device according to embodiments of the present disclosure.
Figure 17:
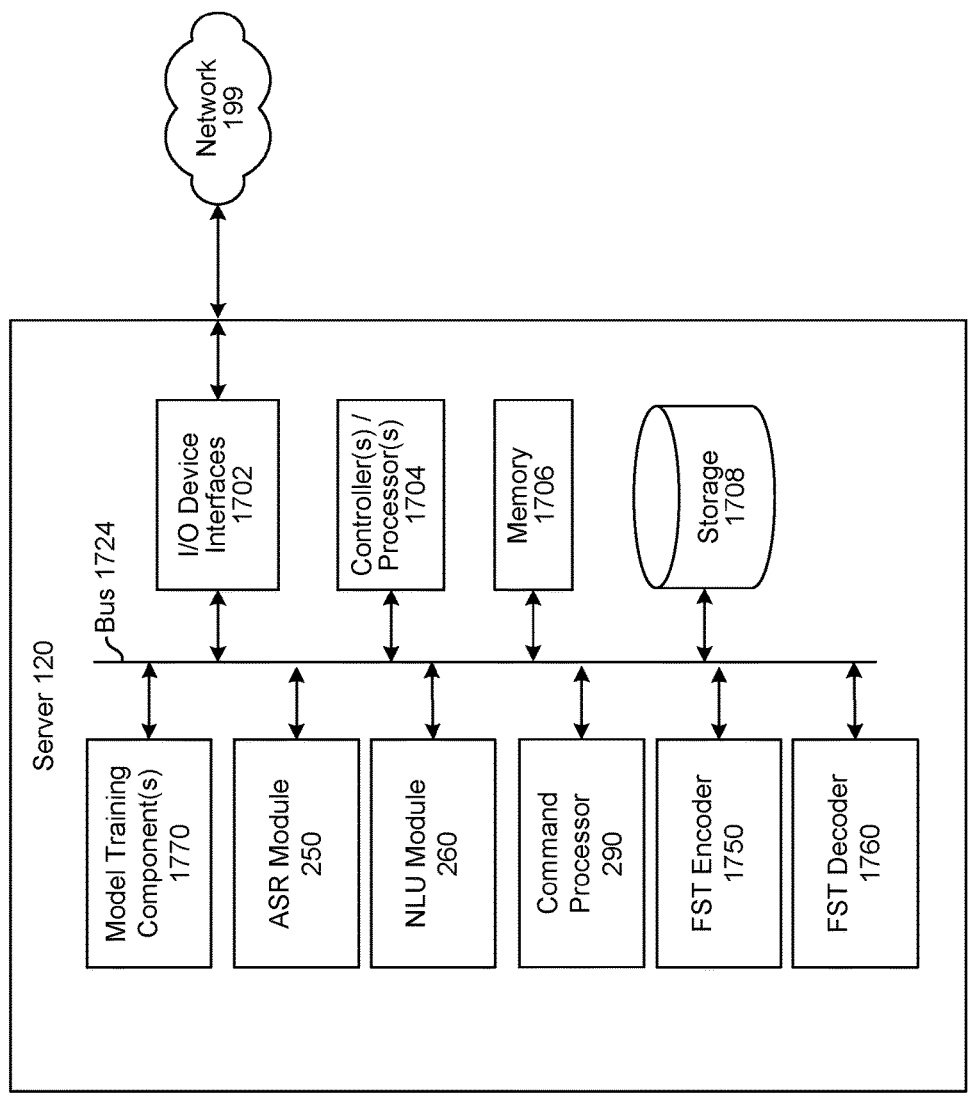
FIG. 17 is a block diagram conceptually illustrating example components of a server according to embodiments of the present disclosure.

FIG. 16 is a block diagram conceptually illustrating a local device 110 that may be used with the described system. FIG. 17 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1604/1704), that may each include a central processing unit (CPU) for processing data and computer-readable instructions, and a memory (1606/1706) for storing data and instructions of the respective device. The memories (1606/1706) may individually include volatile random access memory (RAM), non-volatile read only memory (ROM), non-volatile magnetoresistive (MRAM) and/or other types of memory. Each device may also include a data storage component (1608/1708), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1602/1702).

Computer instructions for operating each device (110/120) and its various components may be executed by the respective device's controller(s)/processor(s) (1604/1704), using the memory (1606/1706) as temporary "working" storage at runtime. A device's computer instructions may be stored in a non-transitory manner in non-volatile memory (1606/1706), storage (1608/1708), or an external device(s). Alternatively, some or all of the executable instructions may be embedded in hardware or firmware on the respective device in addition to or instead of software.

Each device (110/120) includes input/output device interfaces (1602/1702). A variety of components may be connected through the input/output device interfaces, as will be discussed further below. Additionally, each device (110/120) may include an address/data bus (1624/1724) for conveying data among components of the respective device. Each component within a device (110/120) may also be directly connected to other components in addition to (or instead of) being connected to other components across the bus (1624/1724).

Referring to the device 110 of FIG. 16, the device 110 may include a display 1618, which may comprise a touch interface 1619. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1602 that connect to a variety of components such as an audio output component such as a speaker 1660, a wired headset or a wireless headset (not illustrated) or other component capable of outputting audio. The device 110 may also include an audio capture component. The audio capture component may be, for example, a microphone 1650 or array of microphones, a wired headset or a wireless headset (not illustrated), etc. The microphone 1650 may be configured to capture audio. If an array of microphones is included, approximate distance to a sound's point of origin may be performed acoustic localization based on time and amplitude differences between sounds captured by different microphones of the array. The device 110 (using microphone 1650, wakeword detection module 220, ASR module 250, etc.) may be configured to determine audio data corresponding to detected audio data. The device 110 (using input/output device interfaces 1602, antenna 1614, etc.) may also be configured to transmit the audio data to server 120 for further processing or to process the data using internal components such as a wakeword detection module 220.

For example, via the antenna(s), the input/output device interfaces 1602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1608 may store data relating to keywords and functions to enable the wakeword detection module 220 to perform the algorithms and methods described above. The locally stored speech models may be preconfigured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1608 and compare the captured audio to the stored models and audio sequences using audio comparison, pattern recognition, keyword spotting, audio signature, and/or other audio processing techniques.

The server may include a model training component 1770. The model training component may be used to create the customized FSTs and/or word tables discussed above.

Figure 7:
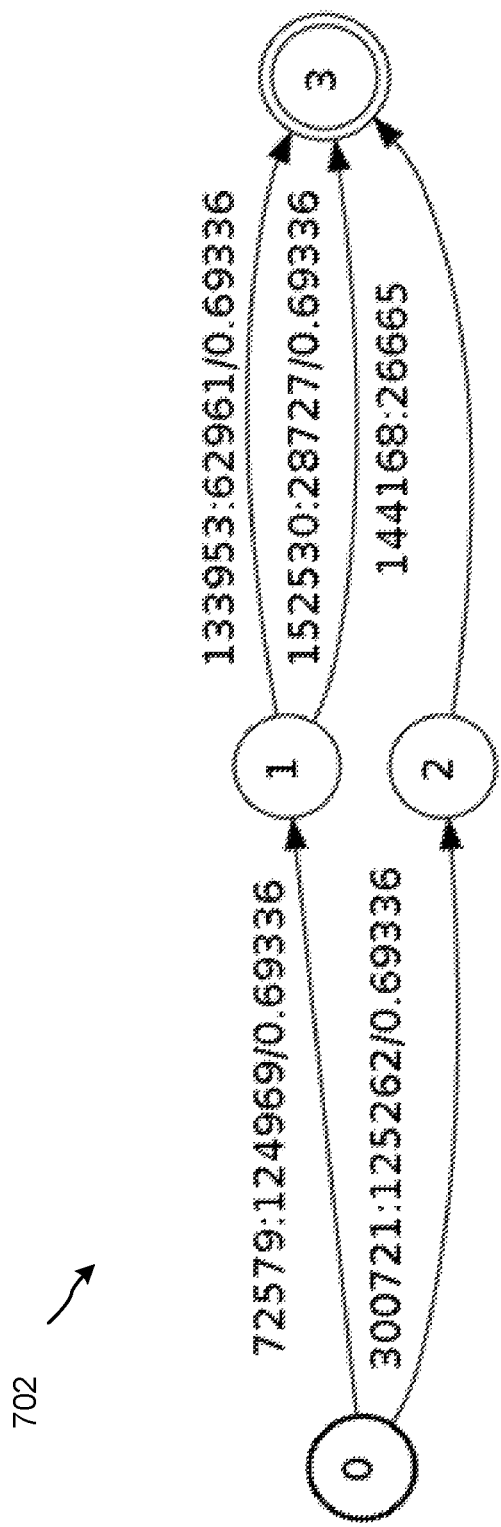
FIG. 7 illustrates a user-specific FST corresponding to a sample music collection with word indices as arc labels according to embodiments of the present disclosure.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 7 and 8, are exemplary, and may be located a stand-alone device or may be included, in whole or in part, as a component of a larger device or system.

Figure 18:
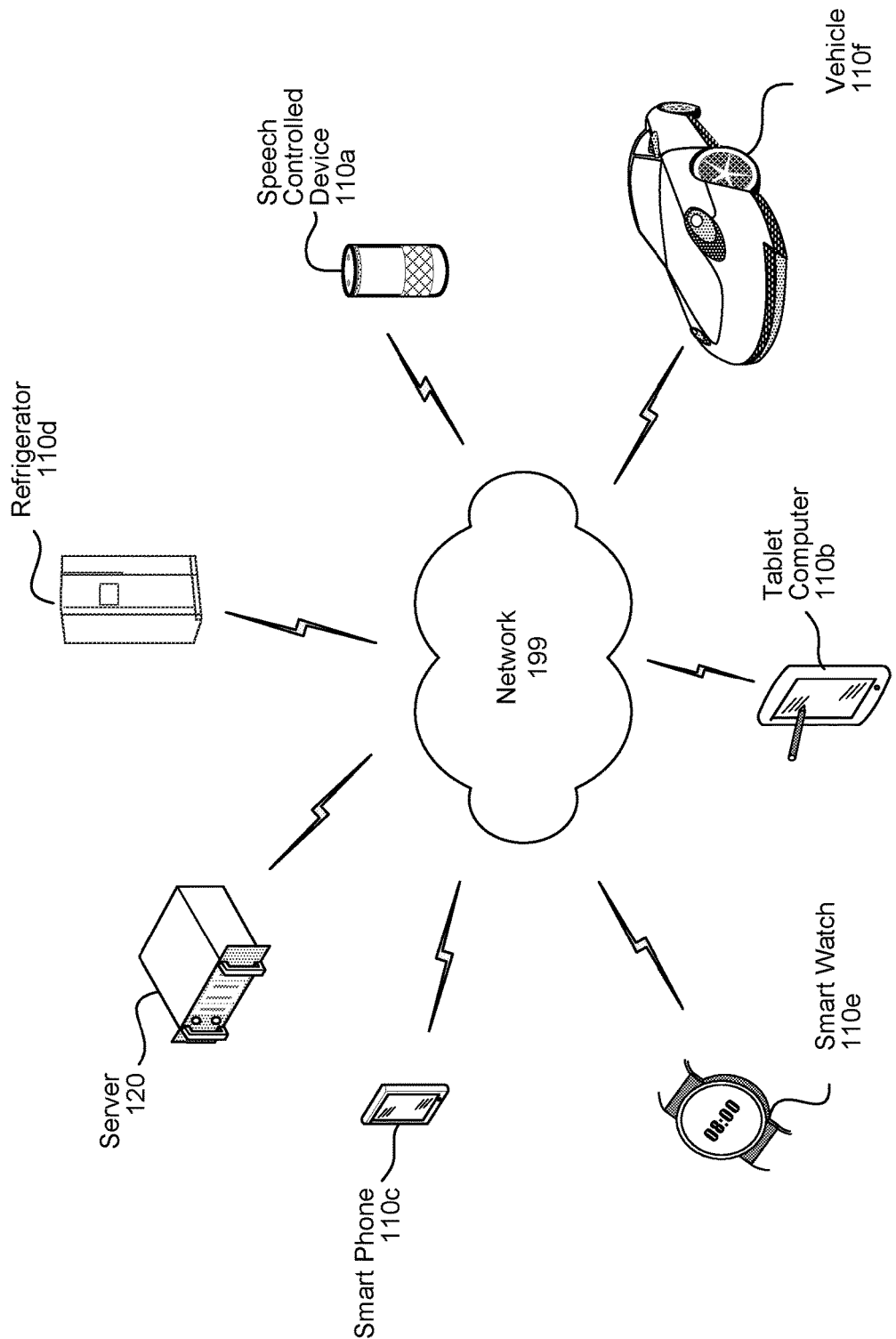
FIG. 18 illustrates an example of a computer network for use with the system.

As illustrated in FIG. 18 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 1650 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for creating and using a user-specific language model, the method comprising, during a training period:
   identifying a first finite state transducer (FST) for automatic speech recognition (ASR), wherein the first FST corresponds to an ASR language model and is configured for use in processing audio data from a plurality of user devices;
   identifying a first table corresponding to the first FST, wherein the first table includes a first plurality of indexed entries, a first entry of the first plurality of indexed entries corresponding to a first word represented in the ASR language model;
   identifying music collection data associated with a first user profile, the music collection data including a plurality of word strings associated with a music collection corresponding to the first user profile, the plurality of word strings selected from among artist names, song titles and album titles;
   generating a second table corresponding to words in the plurality of word strings, wherein the second table includes:
     a first entry including a first word in the plurality of word strings and a first index value corresponding to a third entry in the first table corresponding to the first word, and
     a second entry including a second word in the plurality of word strings and a second index value corresponding to a fourth entry in the first table corresponding to the second word;
   generating a second FST corresponding to the music collection data, wherein the second FST includes a third index value corresponding to the first entry and a fourth index value corresponding to the second entry; and storing the second table and the second FST.

2. The computer-implemented method of claim 1, further comprising, during a runtime period:
   receiving audio data associated with the first user profile;
   generating a modified second FST by substituting the first index value for the third index value and the second index value for the fourth index value;
   writing the first FST and the modified second FST into memory;
   performing ASR using the first FST and the modified second FST; and
   determining ASR output including the first word and the second word.

3. The computer-implemented method of claim 1, further comprising, during the training period:
   determining that a third word in the music collection data is not represented in the first table;
   performing grapheme-to-phoneme processing to determine a third FST representing an estimated pronunciation of the third word; and
   storing an association between the third FST and the second FST,
   wherein creating the second table further comprises creating a third entry including a reference to the third FST.

4. The computer-implemented method of claim 3, further comprising, during a runtime period:
   receiving audio data associated with the first user profile;
   identifying a third table associated with an updated ASR language model FST to be used during the runtime period;
   identifying a fifth entry in the third table corresponding to the third word;
   generating a modified second table including an updated third entry including a fifth index value to the fifth entry;
   generating a modified second FST by substituting the first index value for the third index value, the second index value for the fourth index value, and the fifth index value for the reference; and
   performing ASR using the updated ASR language model FST and the modified second FST.

5. A computer-implemented method, comprising:
   identifying a first language model configured for speech processing corresponding to multiple devices;
   identifying a first table representing words corresponding to the first language model;
   identifying a plurality of word strings associated with a first user profile;
   creating a second language model configured for speech processing corresponding to the plurality of word strings, the second language model including a plurality of references to a second table;
   generating a second table representing words of the plurality of word strings, the second table including at least:
      a first entry including a first word in the plurality of word strings and a first index value corresponding to a third entry in the first table, the third entry corresponding to the first word, and
      a second entry including a second word in the plurality of word strings and a second index value corresponding to a fourth entry in the first table, the fourth entry corresponding to the second word;
   generating a second language model configured for speech processing corresponding to the first user profile, the second language model including a third index value corresponding to the first entry and a fourth index value corresponding to the second entry; and
   storing the second table and the second language model as associated with the first user profile.

6. The computer-implemented method of claim 5, further comprising:
   determining that at least a portion of the first table has changed resulting in an updated first table including a fifth entry corresponding to the first word and a sixth entry corresponding to the second word;
   generating an updated second table, the updated second table including at least:
      an updated first entry including the first word and a fifth index value corresponding to the fifth entry, and
      an updated second entry including the second word and a second index value corresponding to the sixth entry,
   wherein, after creating the updated second table, the third index value points to the updated first entry and the fourth index value points to the updated second entry.

7. The computer-implemented method of claim 5, further comprising:
   identifying a second plurality of word strings associated with a second user profile;
   generating a third language model configured for speech processing corresponding to the second plurality of word strings, the third language model including a second plurality of references to a third table;
   generating a third table representing words of the second plurality of word strings, the third table including at least:
      a fifth entry including the first word and the first index value, and
      a sixth entry including a third word in the second plurality of word strings and a fifth index value corresponding to a fifth entry in the first table corresponding to the third word;
   generating a third language model configured for speech processing corresponding to the second user profile, the third language model including a sixth index value corresponding to the fifth entry and a seventh index value corresponding to the sixth entry; and
   storing the third table and the third language model as associated with the second user profile.

8. The computer-implemented method of claim 5, further comprising:
   receiving audio data associated with the first user profile;
   generating a modified second language model by substituting the first index value for the third index value and the second index value for the fourth index value;
   writing the first language model and the modified second language model into memory;
   performing speech processing using the first language model and the modified second language model; and
   determining speech processing output including the first word and the second word.

9. The computer-implemented method of claim 5, further comprising:
   determining that a third word in the plurality of word strings is not represented in the first table; and
   performing grapheme-to-phoneme processing to determine pronunciation data representing an estimated pronunciation of the third word, wherein creating the second table further comprises creating a third entry including a reference to the pronunciation data.

10. The computer-implemented method of claim 9, further comprising:
receiving audio data associated with the first user profile;
identifying a third table associated with an updated language model to be used for speech processing;
identifying a fifth entry in the third table corresponding to the third word;
generating a modified second table including an updated third entry including a fifth index value to the fifth entry;
generating a modified second language model by substituting the first index value for the third index value, the second index value for the fourth index value, and the fifth index value for the reference; and
performing speech processing using the first language model and the modified second language model.

11. The computer-implemented method of claim 9, further comprising:
receiving audio data associated with the first user profile;
identifying a runtime language model to be used for processing the audio data;
determining that the third word is not associated with the runtime language model;
writing the runtime language model, the second language model, and the pronunciation data into memory; and
performing speech processing using the runtime language model, the second language model, and the pronunciation data.

12. The computer-implemented method of claim 5, wherein the first language model corresponds to a first finite state transducer and the second language model corresponds to a second finite state transducer.

13. A system, comprising:
at least one processor;
at least one memory device including instructions operable to be executed by the at least one processor to configure the system to:
identify a first language model configured for speech processing corresponding to multiple devices;
identify a first table representing words corresponding to the first language model;
identify a plurality of word strings associated with a first user profile;
generate a second language model configured for speech processing corresponding to the plurality of word strings, the second language model including a plurality of references to a second table;
generate a second table representing words of the plurality of word strings, the second table including at least:
a first entry including a first word in the plurality of word strings and a first index value corresponding to a third entry in the first table, the third entry corresponding to the first word, and
a second entry including a second word in the plurality of word strings and a second index value corresponding to a fourth entry in the first table, the fourth entry corresponding to the second word;
generate a second language model configured for speech processing corresponding to the first user profile, the second language model including a third index value corresponding to the first entry and a fourth index value corresponding to the second entry; and
store the second table and the second language model as associated with the first user profile.

14. The system of claim 13, wherein the instructions further configure the system to:
determine that at least a portion of the first table has changed resulting in an updated first table including a fifth entry corresponding to the first word and a sixth entry corresponding to the second word;
generate an updated second table, the updated second table including at least:
an updated first entry including the first word and a fifth index value corresponding to the fifth entry, and
an updated second entry including the second word and a second index value corresponding to the sixth entry,
wherein, after creation of the updated second table, the third index value points to the updated first entry and the fourth index value points to the updated second entry.

15. The system of claim 13, wherein the instructions further configure the system to:
identify a second plurality of word strings associated with a second user profile;
generate a third language model configured for speech processing corresponding to the second plurality of word strings, the third language model including a second plurality of references to a third table;
generate a third table representing words of the second plurality of word strings, the third table including at least:
a fifth entry including the first word and the first index value, and
a sixth entry including a third word in the second plurality of word strings and a fifth index value corresponding to a fifth entry in the first table corresponding to the third word;
generate a third language model configured for speech processing corresponding to the second user profile, the third language model including a sixth index value corresponding to the fifth entry and a seventh index value corresponding to the sixth entry; and
store the third table and the third language model as associated with the second user profile.

16. The system of claim 13, wherein the instructions further configure the system to:
receive audio data associated with the first user profile;
generate a modified second language model by substituting the first index value for the third index value and the second index value for the fourth index value;
write the first language model and the modified second language model into memory;
perform speech processing using the first language model and the modified second language model; and
determine speech processing output including the first word and the second word.

17. The system of claim 13, wherein the instructions further configure the system to:
determine that a third word in the plurality of word strings is not represented in the first table; and
perform grapheme-to-phoneme processing to determine pronunciation data representing an estimated pronunciation of the third word,
wherein the instructions that configure the system to create the second table further comprise instructions that further the system to create a third entry in the second table, the third entry including a reference to the pronunciation data.

18. The system of claim 17, wherein the instructions further configure the system to:
- receive audio data associated with the first user profile;
- identify a third table associated with an updated language model to be used for speech processing;
- identify a fifth entry in the third table corresponding to the third word;
- generate a modified second table including an updated third entry including a fifth index value to the fifth entry;
- generate a modified second language model by substituting the first index value for the third index value, the second index value for the fourth index value, and the fifth index value for the reference; and
- perform speech processing using the first language model and the modified second language model.

19. The system of claim 17, wherein the instructions further configure the system to:
- receive audio data associated with the first user profile;
- identify a runtime language model to be used for processing the audio data;
- determine that the third word is not associated with the runtime language model;
- write the runtime language model, the second language model, and the pronunciation data into memory; and
- perform speech processing using the runtime language model, the second language model, and the pronunciation data.

20. The system of claim 13, wherein the first language model corresponds to a first finite state transducer and the second language model corresponds to a second finite state transducer.

* * * * *